US008899964B2

(12) United States Patent
Babin et al.

(10) Patent No.: US 8,899,964 B2
(45) Date of Patent: Dec. 2, 2014

(54) EDGE-GATED INJECTION MOLDING APPARATUS

(71) Applicant: Mold-Masters (2007) Limited, Georgetown (CA)

(72) Inventors: Denis Babin, Georgetown (CA); Scott Gammon, Guelph (CA); Douglas Ursu, Orangeville (CA); John Di Simone, Woodbridge (CA)

(73) Assignee: Mold-Masters (2007) Limited, Georgetown, ON (CA)

( * ) Notice: Subject to any disclaimer, the term of this patent is extended or adjusted under 35 U.S.C. 154(b) by 72 days.

(21) Appl. No.: 13/789,201

(22) Filed: Mar. 7, 2013

(65) Prior Publication Data

US 2013/0243899 A1 Sep. 19, 2013

Related U.S. Application Data

(60) Provisional application No. 61/612,134, filed on Mar. 16, 2012.

(51) Int. Cl.
*B29C 45/27* (2006.01)
*B29C 45/22* (2006.01)
(52) U.S. Cl.
CPC ............. *B29C 45/22* (2013.01); *B29C 45/2735* (2013.01); *B29C 2045/2793* (2013.01); *B29C 2045/2761* (2013.01)
USPC .......... 425/568; 425/570; 425/572; 264/328.8
(58) Field of Classification Search
CPC ...... B29C 45/27; B29C 45/2735; B29C 45/20
USPC ........................ 425/568, 570, 572; 264/328.8
See application file for complete search history.

(56) References Cited

U.S. PATENT DOCUMENTS 3,677,682 A    7/1972   Putkowski
4,010,903 A *   3/1977   Sakuri et al. ............... 239/533.1

(Continued)

FOREIGN PATENT DOCUMENTS

AU        452137      3/1973
DE      19742099      4/1998

(Continued)

OTHER PUBLICATIONS

"European Search Report", Application No. 13 00 1372, Jul. 18, 2013.

(Continued)

*Primary Examiner* — Tim Heitbrink
(74) *Attorney, Agent, or Firm* — Medler Ferro PLLC

(57) ABSTRACT

An edge-gated injection molding apparatus is disclosed for distributing a melt stream to a plurality of mold cavities aligned on opposing sides of an injection manifold assembly. The injection manifold assembly includes melt outlets aligned on opposing sides thereof with a nozzle seal in fluid communication with each melt outlet for transferring the melt stream to a corresponding mold cavity. A sliding relationship between each nozzle seal and its respective melt outlet while the nozzle seal is securely held relative to the mold gate permits misalignment between the nozzle seal and its respective melt outlet in the cold condition without causing stress on the nozzle seal. Under operating conditions, the sliding relationship permits subsequent alignment between the nozzle seal and its respective melt outlet. The nozzle seal has a two-piece gate seal with components thereof threadably coupled to each other such that relative rotation therebetween applies a sealing preload.

20 Claims, 23 Drawing Sheets

(56) References Cited

U.S. PATENT DOCUMENTS

| | | | |
|---|---|---|---|
| 4,312,630 A | 1/1982 | Travaglini | |
| 4,588,367 A | 5/1986 | Schad | |
| 5,141,155 A | 8/1992 | Jacobsen | |
| 5,206,040 A | 4/1993 | Gellert | |
| 5,366,370 A * | 11/1994 | Gellert | 425/549 |
| 5,879,727 A | 3/1999 | Puri | |
| 5,952,016 A * | 9/1999 | Gellert | 425/190 |
| 6,261,083 B1 | 7/2001 | Stern | |
| 6,302,680 B1 | 10/2001 | Gellert et al. | |
| 6,478,567 B1 | 11/2002 | Kushnir et al. | |
| 6,988,883 B2 * | 1/2006 | Babin et al. | 425/549 |
| 7,179,081 B2 * | 2/2007 | Sicilia et al. | 425/549 |
| 7,207,790 B2 | 4/2007 | Trakas | |
| 7,207,795 B2 | 4/2007 | Ciccone | |
| 7,303,384 B2 | 12/2007 | Schreck | |
| 7,329,117 B2 | 2/2008 | Ciccone | |
| 7,396,226 B2 * | 7/2008 | Fairy | 425/549 |
| 7,510,393 B2 | 3/2009 | Glaesener et al. | |
| 7,614,869 B2 * | 11/2009 | Babin et al. | 425/549 |
| 7,658,606 B2 * | 2/2010 | Klobucar et al. | 425/564 |
| 7,794,228 B2 | 9/2010 | Catoen | |
| 8,282,387 B2 * | 10/2012 | Braun | 425/549 |
| 2003/0091684 A1 | 5/2003 | Hefner | |
| 2004/0137107 A1 | 7/2004 | Babin et al. | |
| 2004/0258796 A1 * | 12/2004 | Fairy | 425/570 |
| 2006/0153944 A1 | 7/2006 | Ciccone | |
| 2007/0003661 A1 | 1/2007 | Ciccone | |
| 2008/0131552 A1 | 6/2008 | Gaillard et al. | |
| 2008/0131553 A1 | 6/2008 | Gaillard et al. | |
| 2009/0110765 A1 | 4/2009 | Mohammed | |
| 2009/0269430 A1 | 10/2009 | Catoen | |
| 2010/0015274 A1 | 1/2010 | Fill | |
| 2010/0092602 A1 | 4/2010 | Gunther et al. | |
| 2012/0181728 A1 * | 7/2012 | Greb | 264/328.15 |
| 2013/0056562 A1 * | 3/2013 | Overfield et al. | 239/583 |
| 2013/0202730 A1 * | 8/2013 | Esser et al. | 425/549 |
| 2014/0037783 A1 * | 2/2014 | Gray et al. | 425/568 |

FOREIGN PATENT DOCUMENTS

| | | |
|---|---|---|
| DE | 202007017136 U1 | 5/2009 |
| DE | 10008722 B4 | 2/2010 |
| DE | 102009037343 A1 | 2/2011 |
| EP | 0932488 B1 | 5/2003 |
| EP | 2199055 A1 | 6/2010 |
| EP | 2228193 | 9/2010 |
| EP | 2243613 A1 | 10/2010 |
| EP | 2308664 | 4/2011 |
| EP | 2314438 | 4/2011 |
| EP | 2447007 | 5/2012 |
| JP | 55140537 | 11/1980 |
| KR | 102006003297 | 3/2006 |
| WO | WO-2009/124865 | 10/2009 |
| WO | WO-2012/015778 | 2/2012 |
| WO | WO-2012/094104 | 7/2012 |
| WO | WO-2012/096831 | 7/2012 |
| WO | WO-2012/115614 | 8/2012 |

OTHER PUBLICATIONS

Goldsberry, Clare. "Hot runner targets deep-draw parts like syringe barrels where quality, gate vestiges are critical", PlasticsToday.com, Nov. 11, 2011.

Husky Injection Molding Systems, "Ultra SideGate Technology Flyer", www.husky.ca, Oct. 1, 2011.

* cited by examiner

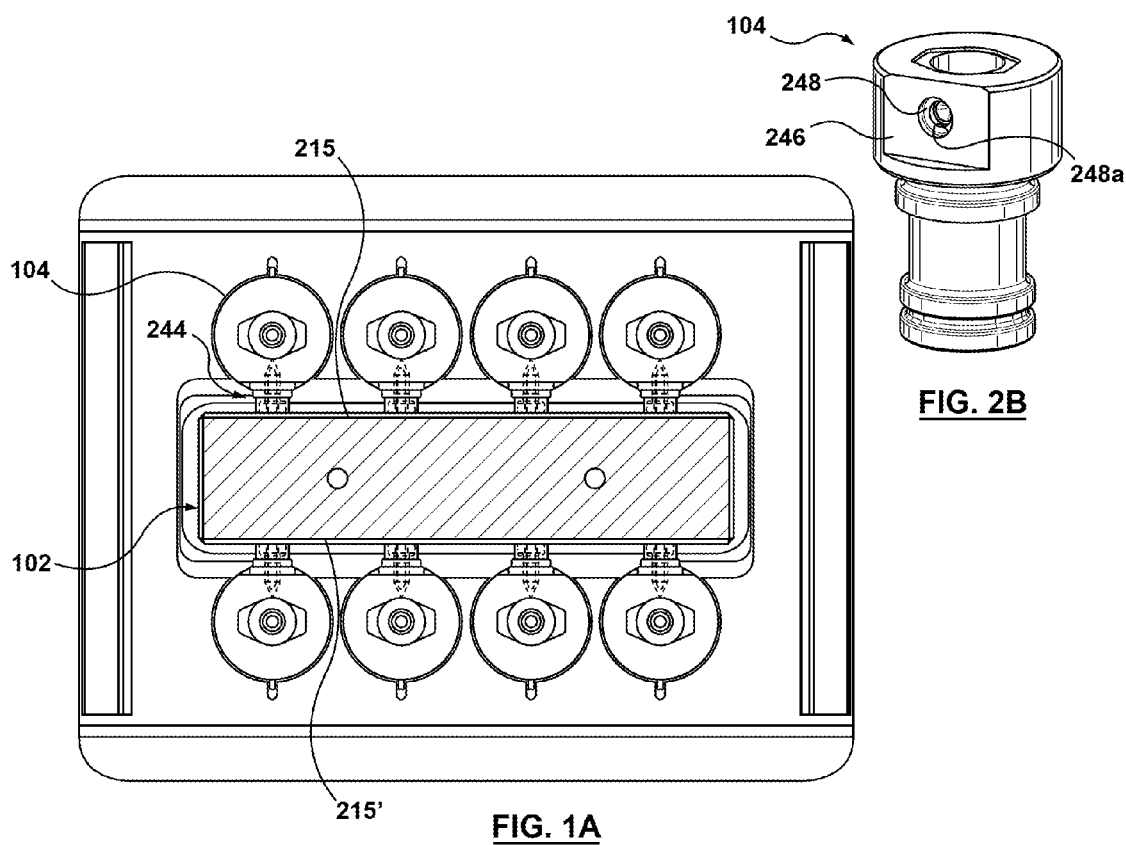

EDGE-GATED INJECTION MOLDING APPARATUS

CROSS-REFERENCE TO RELATED APPLICATION

This application claims the benefit under 35 U.S.C. §119(e) of U.S. Appl. No. 61/612,134 filed Mar. 16, 2012, the disclosure of which is incorporated by reference herein in its entirety.

FIELD OF THE INVENTION

The present invention relates to an injection molding apparatus, and more particularly, to an edge-gated injection molding apparatus.

BACKGROUND OF THE INVENTION

Edge-gating applications have been developed that use an injection manifold that is in fluid communication with either a radial array of mold gates and associated mold cavities or a linear array of mold gates and associated mold cavities. When providing a melt stream to a mold gate, a nozzle tip for delivering the melt stream to the mold gate must be centered in the gate orifice under operating conditions to ensure even cavity filling. When providing the melt stream to a radial array of mold gates in an edge-gated application, injection manifolds known in the art tend to be cylindrical or puck-shaped, which results in thermal expansion of the injection manifold under operating conditions being directed primarily radially outward from a center of the injection manifold toward each nozzle tip and associated mold gate such that alignment between the nozzle tip and mold gate is substantially constant under both hot and cold conditions. Accordingly, each nozzle tip may have an upstream end thereof held within a side surface of the cylindrical or puck-shaped injection manifold and a downstream end thereof held within a cavity plate or cavity insert that forms the mold gate without thermal expansion adversely affecting operation thereof.

When providing the melt stream to a linear array of mold gates in an edge-gated application, injection manifolds known in the art tend to be rectangular in shape with a row of nozzle tips secured within each of the opposing sides of the injection manifold that are aligned with a corresponding row of mold gates. In order to assure alignment between each nozzle tip and its respective mold gate under operating conditions, in the cold condition a pitch spacing between adjacent nozzle tips/melt outlets of a rectangular injection manifold is less than a spacing between their corresponding mold gates, which may be formed within a cavity plate or a respective cavity insert. However with thermal expansion of a rectangular injection manifold occurring in both lateral and longitudinal directions, each nozzle tip may experience a different amount of movement towards and/or transverse to its mold gate depending on the linear position of the nozzle tip along its respective side of the injection manifold. If such a linear injection manifold feeds only four mold cavities having a relatively close pitch spacing, that is two per side, the injection manifold will be relatively small and heat expansion will be minimal such that each nozzle tip may have an upstream end thereof held within a side surface of the rectangular injection manifold and a downstream end thereof held within a cavity plate or cavity insert that forms the mold gate without thermal expansion adversely affecting operation thereof. Conversely, if a linear injection manifold feeds a larger number of mold cavities having a relatively close pitch spacing or a smaller number of mold cavities having a relatively large pitch spacing, such as eight mold cavities with four per side, for example, there may be as much as 0.2 mm-0.3 mm misalignment between the outermost nozzle tips/melt outlets of the injection manifold, and the corresponding mold gates in a cold condition. During the thermal expansion of heated components that occurs during injection molding operations, a misalignment of this magnitude may cause severe stress on a nozzle tip that is being held, as is conventional, by both the injection manifold and cavity plate/cavity insert, and may in some instances cause a downstream end of the nozzle tip to contact a wall of the cavity plate/cavity insert that surrounds the mold gate, which may damage the nozzle tip and or result in a molded part of poor quality.

Embodiments disclosed herein are directed towards edge-gated injection molding applications for providing a melt stream to a linear array of mold gates and associated mold cavities that solve at least the aforementioned problem associated with current linear array edge-gating solutions. In addition, embodiments hereof are directed to simplifying nozzle tip replacement in edge-gating applications that does not require complete disassembly of the mold and/or to relatively easily taking out-of-service an individual edge-gated mold cavity.

BRIEF SUMMARY OF THE INVENTION

Embodiments hereof are directed to an edge-gated injection molding apparatus having an injection manifold assembly for distributing a melt stream of moldable material to a plurality of mold cavities aligned on opposing sides of the injection manifold assembly. The injection manifold assembly includes a plurality of melt outlets on opposing sides of the injection manifold assembly with a plurality of nozzle seals that are in fluid communication with the plurality of melt outlets for receiving the melt stream therefrom and delivering the melt stream to the plurality of mold cavities. Each nozzle seal includes a two-piece gate seal with a nozzle tip coaxially received therein. The two-piece gate seal has a face seal component for contacting and sealing against a first sealing surface that surrounds a mold gate of a cavity insert and a primary seal component for contacting and sealing against a second sealing surface of the cavity insert, wherein the second sealing surface is located within a counter bore of the cavity insert that is coaxial with the mold gate of the cavity insert to provide alignment between each edge-gated nozzle seal and its respective mold gate under both hot and cold conditions. An upstream surface of the primary seal component of the gate seal and an upstream surface of the nozzle tip are slidably disposed against a respective melt outlet of the injection manifold assembly, with each nozzle seal otherwise not being directly attached or secured to the injection manifold assembly. The sliding relationship between the upstream end of each nozzle seal and its respective melt outlet of the injection manifold assembly, while the downstream end of the nozzle seal is securely held relative to the mold gate, permits misalignment between a melt inlet of the nozzle seal and its respective injection manifold assembly melt outlet in the cold condition without causing stress on the nozzle seal. Moreover when the edge-gated injection molding apparatus is brought to an operating temperature, the sliding relationship permits subsequent alignment between the melt inlet of the nozzle seal and its respective melt outlet to occur during thermal expansion of the injection manifold assembly, which may occur in both lateral and longitudinal directions depending on the linear position of the nozzle seal along the injection manifold assembly.

The face seal component and primary seal component of the two-piece gate seal are threadably coupled to each other such that relative rotation between the components in a first direction applies a sealing load between the injection manifold assembly and cavity insert. The face seal component and primary seal component of the gate seal are accessible from a parting line $P_L$ of the mold such that this configuration permits an operator to more conveniently apply a preload after assembly of the remainder of the edge-gated injection molding apparatus.

BRIEF DESCRIPTION OF DRAWINGS

The foregoing and other features and advantages of the invention will be apparent from the following description of embodiments thereof as illustrated in the accompanying drawings. The accompanying drawings, which are incorporated herein and form a part of the specification, further serve to explain the principles of the invention and to enable a person skilled in the pertinent art to make and use the invention. The drawings are not to scale.

FIG. 1A is a bottom view of a portion of the edge-gated injection molding apparatus of FIG. 1 with the injection manifold assembly shown in section.

FIG. 2B is a perspective view of a downstream end of a cavity insert in accordance with an embodiment hereof.

DETAILED DESCRIPTION OF THE INVENTION

Specific embodiments of the present invention are now described with reference to the figures, wherein like reference numbers indicate identical or functionally similar elements. The following detailed description is merely exemplary in nature and is not intended to limit the invention or the application and uses of the invention. In the following description, "downstream" is used with reference to the direction of mold material flow from an injection unit of an injection molding machine to a mold cavity of a mold of an injection molding system, and also with reference to the order of components or features thereof through which the mold material flows from the injection unit to the mold cavity, whereas "upstream" is used with reference to the opposite direction. Although the description of embodiments hereof is in the context of a hot runner injection molding system, the invention may also be used in other molding applications where it is deemed useful, nonlimiting examples of which include molding of thermoset resins such as liquid silicone rubber or the like. Furthermore, there is no intention to be bound by any expressed or implied theory presented in the preceding technical field, background, brief summary or the following detailed description.

Figure 1:
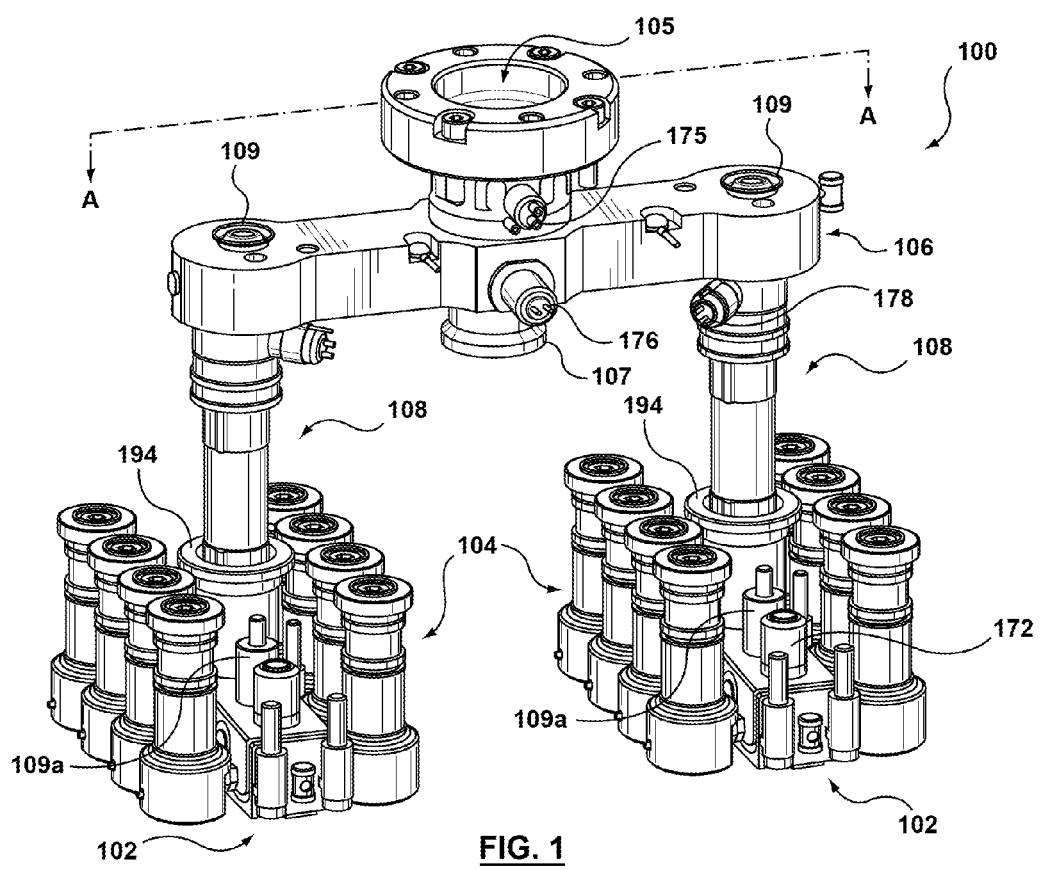
FIG. 1 is a perspective view of an edge-gated injection molding apparatus in accordance with an embodiment hereof.
Figure 2:
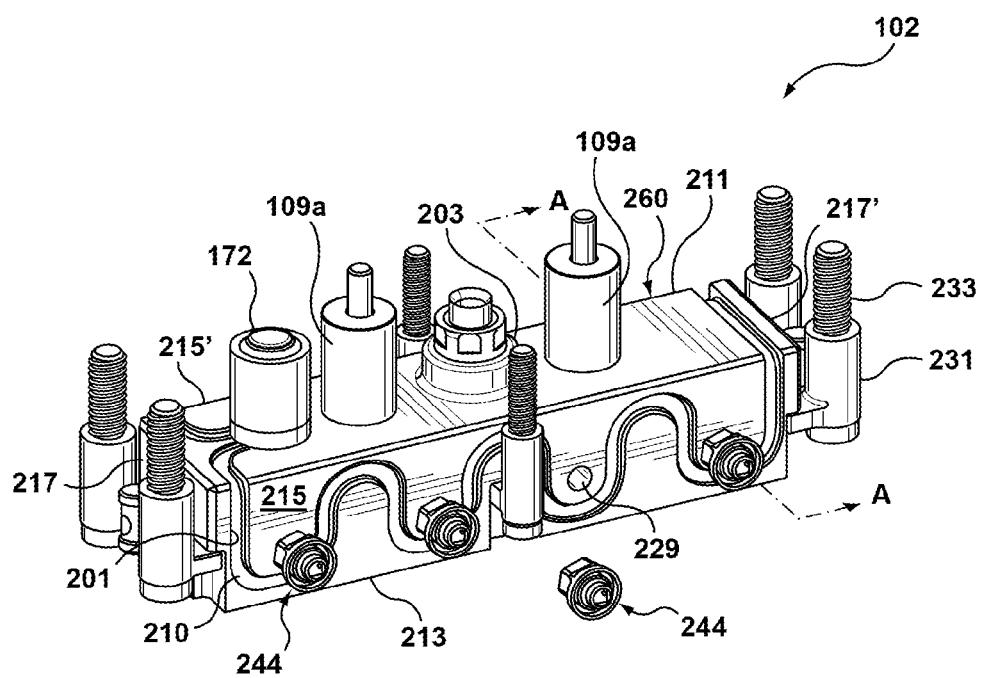
FIG. 2 is a perspective view of an injection manifold assembly in accordance with an embodiment hereof.

FIG. 1 is a perspective view of an edge-gated injection molding apparatus 100 in accordance with an embodiment hereof, with FIG. 2 being a perspective view of an injection manifold assembly 102 in accordance with an embodiment hereof removed from injection molding apparatus 100. It would be understood by one of ordinary skill in the art that injection molding apparatus 100 constitutes a hot half of a molding system that is designed to mate with a cold half and cavity inserts 104 thereof in an injection molding machine (not shown). It also would be understood by one of ordinary skill in the art that in use injection molding apparatus 100 is housed within various mold plates, such as, for example, a back plate 312, a manifold plate 314, a cooled mold plate 316 and a cavity plate 318 as shown with reference to FIG. 3, which depicts a sectional view of apparatus 100 taken along line A-A of FIG. 1 as assembled for use.

Figure 3:
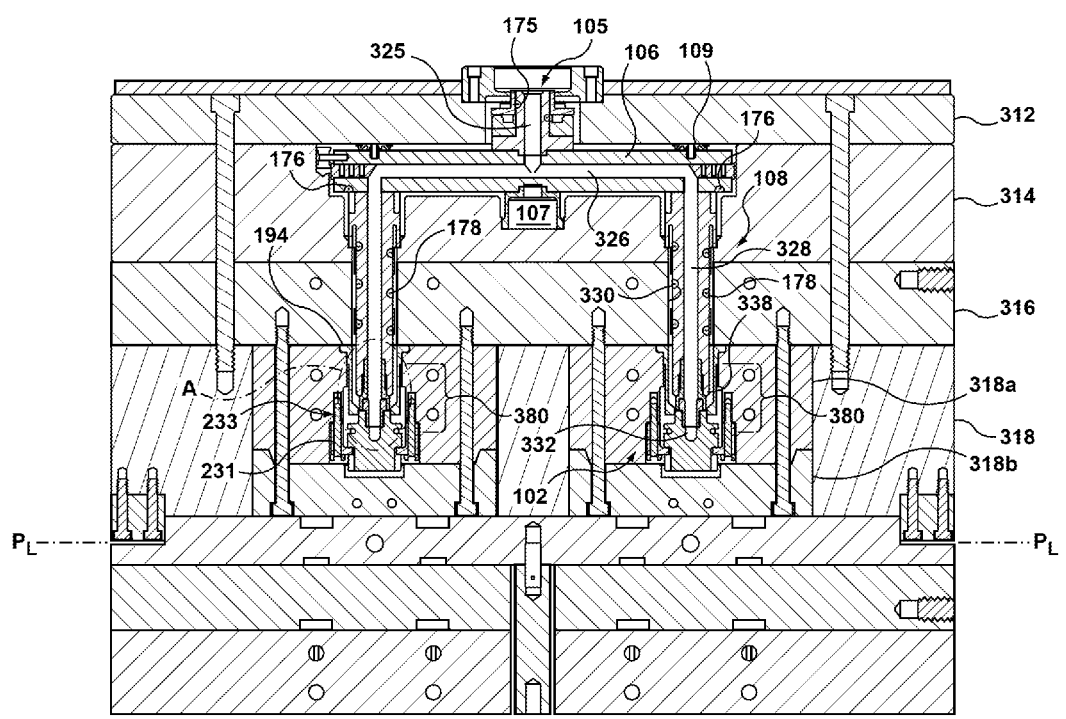
FIG. 3 depicts a sectional view of the edge-gated injection molding apparatus of FIG. 1 as taken along line A-A of FIG. 1.

With reference to FIGS. 1 and 3, edge-gated injection molding apparatus 100 includes a heated inlet or sprue 105, a hot runner injection molding manifold 106 and two hot runner injection molding nozzles 108 for directing a melt stream of moldable material under pressure from an injection molding machine nozzle (not shown) to an injection manifold assembly 102 from which the melt stream is delivered to a plurality of cavity inserts 104, as explained in more detail below. Sprue 105 includes a heater 175, manifold 106 includes a heater 176, each nozzle 108 includes a heater 178 and each injection manifold assembly 102 includes a heater 172, which are provided for keeping the melt stream of moldable material at a proper processing temperature. Exemplary heaters for use in embodiments hereof may include a wire element heater embedded within or simply wrapped around the hot runner component, such as heaters 172, 175, 176, 178, or a band or cartridge heater where suitable. Sprue 105 is partially disposed within back plate 312 and includes an inlet melt channel 325 for directing the melt stream received from the machine nozzle to a manifold melt channel 326 of manifold 106 that in turns divides the melt stream for distribution to a respective nozzle melt channel 328 of each injection molding nozzle 108. Each nozzle 108 directs the melt stream to a melt channel 332 of injection manifold assembly 102, as explained in more detail below. As would be understood by one of ordinary skill in the art, manifold 106 is located within back plate 312 and cooled manifold plate 314 surrounded by an insulative air gap, wherein an axial position of manifold 106 within the air gap relative to back plate 312 and manifold plate 314 is maintained during operation by a locating ring 107 and various pressure disks 109. Pressure disks 109 also aid in establishing a seal between manifold 106 and each nozzle 108 to prevent melt leakage at the interface between the respective manifold and nozzle melt channels 326, 328 during operation. A person of ordinary skill in the art would understand that there are various ways to axially fix manifold 106 within injection molding system without departing from the scope of the present invention.

Figure 3A:
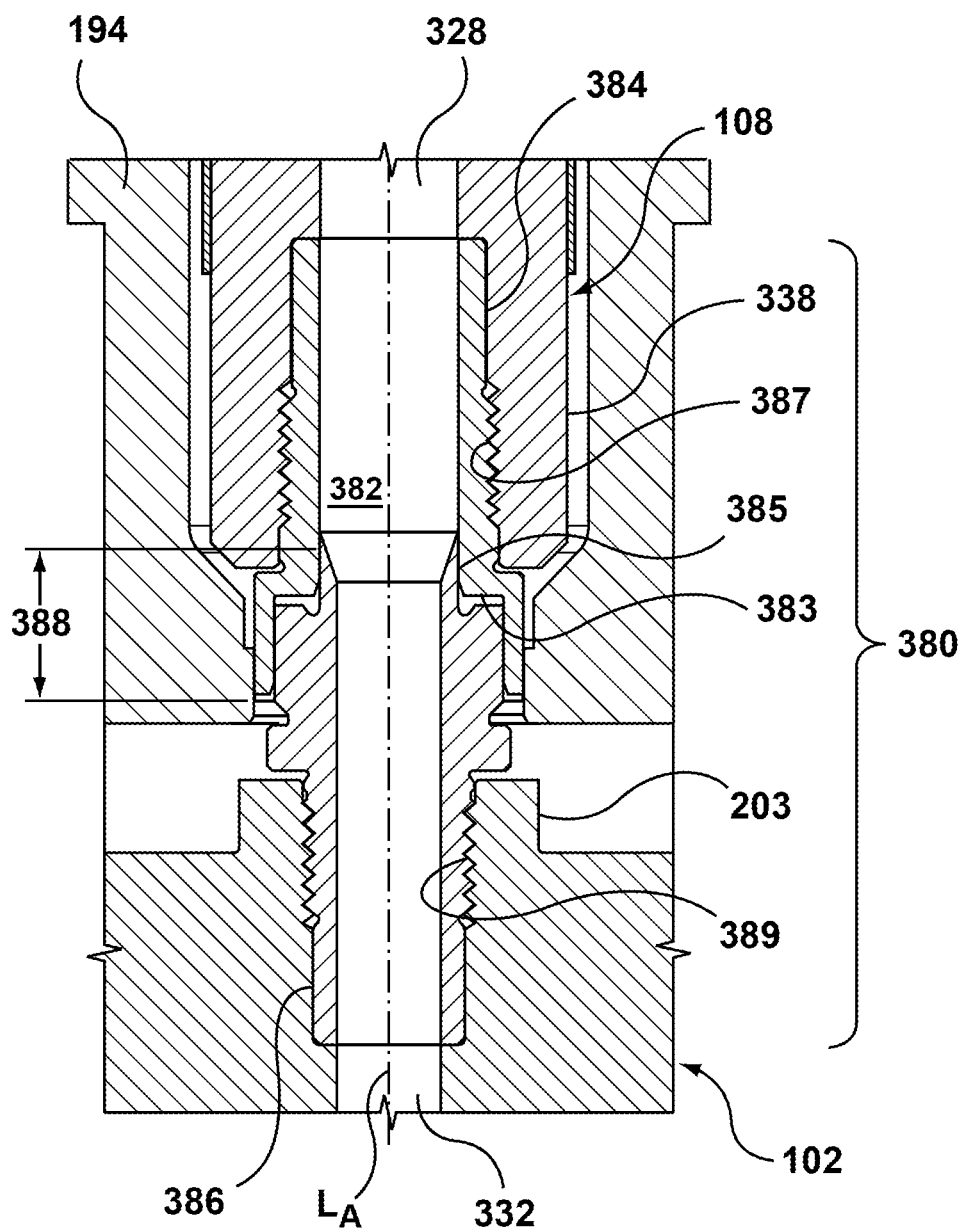
FIG. 3A depicts an enlarged view of an area A of FIG. 3.

Each nozzle 108 extends within a corresponding opening 330 that extends through manifold plate 314, mold plate 316 and an alignment insert 194 within a cavity insert plate 318a. Opening 330 is sized to provide an insulative air gap between the heated nozzle 108 and the aforementioned cooled manifold, mold and cavity insert plates 314, 316, 318a. With reference to FIG. 3A that depicts an enlarged view of an area A of FIG. 3, a downstream end 338 of each nozzle 108 is configured to be coupled to a respective injection manifold assembly 102 via a telescopic connector 380 to permit relative sliding movement therebetween, so as to accommodate axial thermal expansion along longitudinal axis $L_A$. An exemplary arrangement for telescopic connector 380 is represented in FIG. 3A, in which an upstream connector component 384 and a downstream connector component 386 are shown. Upstream connector component 384 attached to nozzle downstream end 338 slides against alignment insert 194 to align nozzle 108 with injection manifold assembly 102. Upstream connector component 384 is attached to nozzle downstream end 338 and downstream connector component 386 is attached within upstream end 203 (also referred to herein as a melt inlet 203) of injection manifold assembly 102 so as to be slidable relative to each other by way of a sliding interface 388. While configurable in a variety of ways, sliding interface 388 is shown as upstream connector component 384 providing a stepped bore 383 in which a corresponding stepped extension 385 of downstream connector component 386 is slidingly received. In an embodiment, downstream end 338 of nozzle 108 is provided with a threaded bore 387 to receive a complimentary threaded portion of upstream connector component 384. Similarly, upstream end or melt inlet 203 of injection manifold assembly 102 is provided with a threaded bore 389 to receive a complimentary threaded portion of downstream connector component 386. As such, nozzle 108 and injection manifold assembly 102 are coupled via telescopic connector 380, whereby nozzle melt channel 328 is in fluid communication with injection manifold melt channel 332. As such, telescopic connector 380 defines a linking melt channel 382 to permit the aforementioned fluid communication between melt channels 328, 332 of nozzle 108 and injection manifold assembly 102. In an embodiment (not shown), upstream connector component 384 may be integrally formed with nozzle downstream end 338 and downstream connector component 386 may be integrally formed with upstream end 203 of injection manifold assembly 102. In a further embodiment (also not shown), nozzle 108 may be fixedly connected to injection manifold assembly 102 such that a telescopic connector is not used therebetween.

Figure 2A:
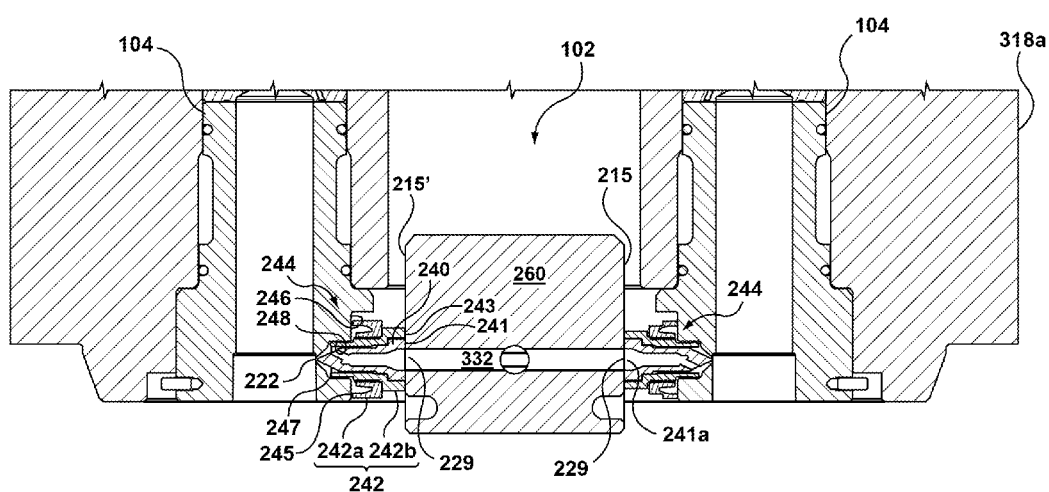
FIG. 2A is an enlarged sectional view of the injection manifold assembly of FIG. 2 as taken along line A-A of FIG. 2, with the injection manifold shown installed within the injection molding apparatus of FIGS. 1 and 3.

FIG. 2 is a perspective view of injection manifold assembly 102 removed from injection molding apparatus 100 and FIG. 2A is an enlarged sectional view of injection manifold assembly 102 taken along line A-A of FIG. 2, wherein the injection manifold assembly is depicted as installed within a portion of injection molding apparatus 100 as shown in FIG. 3. In the embodiment shown in FIG. 2, injection manifold assembly 102 has a substantially brick or cuboid shaped injection manifold 260 that defines an upstream surface 211, a downstream surface 213, opposing side surfaces 215, 215' and opposing end surfaces 217, 217'. A set of spacers 109a shown on upstream surface 211 of injection manifold assembly 102 and are configured to mate within bores or openings (not shown) within cavity insert plate 318a to assure proper positioning and to prevent over-tightening of one or more fasteners, such as cap screws 233 when injection manifold assembly 102 is installed as discussed further below.

FIG. 1A is a bottom view of a portion of edge-gated injection molding apparatus 100 of FIG. 1 with injection manifold assembly 102 shown in section depicting a plurality of nozzle seals 244 in fluid communication with a plurality or cavity inserts 104 that are aligned along opposing side surfaces 215, 215' of injection manifold assembly 102. Accordingly, injection manifold assembly 102 provides a melt stream to a linear array of mold cavities, each of which is partially defined by a respective cavity insert 104. Injection manifold 260 has a continuous groove 201 formed within its upstream and opposing side surfaces 215, 215' for receiving a heating element 210 of heater 172. With reference to FIGS. 2 and 3, a plurality of L-shaped couplers or clamps 231 and associated cap screws or fasteners 233 are used to secure injection manifold assembly 102, and more particularly injection manifold 260, to cavity insert plate 318a. The attachment of injection manifold 260 to cavity insert plate 318a by L-shaped couplers 231 ensures that any growth in a thickness or height of injection manifold 260 due to thermal expansion will occur in a direction away from the parting line $P_L$ of the mold, which simplifies heat expansion-nozzle seal inlet/injection manifold outlet calculations in embodiments that use a telescopic connector to accommodate axial thermal expansion, such as the embodiment shown in FIG. 3. In addition, cap screws 233 and L-shaped couplers 231 are accessible from a parting line $P_L$ of edge-gated injection molding apparatus 102 upon removal of a cover plate 318b, such that the entire injection manifold assembly 102 may be removed from the parting line $P_L$ of the mold.

In another embodiment, an injection manifold 260 may be made of a sufficient width and length such that longitudinal bores may be made therein for receiving one or more fasteners, such as cap screws 233, there through to secure injection manifold 260 to a respective cavity insert plate 318a, in which complementary threaded holes for receiving a respective cap screw 233 would be provided. In another embodiment, an injection manifold 260 may be of a sufficient width and length so as to include threaded bores therein that align with through holes in a respective cavity insert plate 318a through which one or more fasteners, such as cap screws 233, may extend to couple the injection manifold 260 to the respective cavity insert plate 318a.

Figure 4:
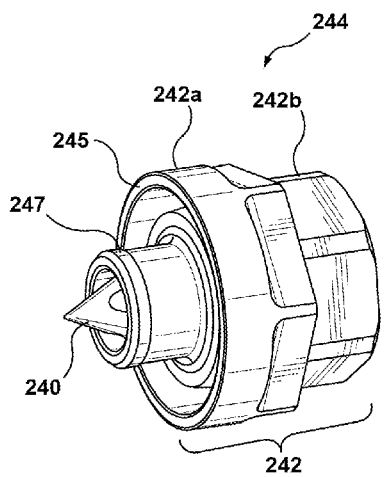
FIG. 4 is a perspective view of a nozzle seal in accordance with an embodiment hereof.

Injection manifold 260 includes melt inlet 203 in upstream surface 211 that is in fluid communication with melt channel 332 formed therein for receiving a melt stream of moldable material, as described above, and distributing the melt stream via a plurality of melt outlets 229 in opposing side surfaces 215, 215'. A nozzle seal 244 is slidably disposed against a respective melt outlet 229 of injection manifold 260 for receiving the melt stream therefrom. With reference to FIGS. 2A and 4, which is a perspective view of nozzle seal 244, nozzle seal 244 includes a two-piece gate seal 242 with a nozzle tip 240 coaxially received therein. The two-piece gate seal 242 has a face seal component 242a that surrounds and is threadably coupled to a primary seal component 242b. In embodiments hereof, nozzle tip 240 may be formed from a thermally conductive material, such as beryllium copper, and face seal component 242a and primary seal component 242b of gate seal 242 may be formed from a less thermally conductive material, such H13 steel.

Face seal component 242a of gate seal 242 includes a face seal surface 245 for contacting and sealing against a first sealing surface 246 that surrounds a mold gate 222 of cavity insert 104 and primary seal component 242b of gate seal 242 includes a primary seal surface 247 for contacting and sealing against a second sealing surface 248 of cavity insert 104. With reference to FIG. 2B, which is a perspective view of a downstream end of cavity insert 104, the second sealing surface 248 is located within a counter bore 248a of cavity insert 104 that is coaxial with mold gate 222 therein. In this manner, primary seal component 242b seals on an outer circumferential surface within the counter bore that leads to its respective mold gate 222 and assures axial alignment of nozzle tip 240 with its respective mold gate 222 under both cold and hot conditions.

An upstream surface 243 of primary seal component 242b of gate seal 242 and an upstream surface 241 of nozzle tip 240 are slidably disposed against the portion of side surface 215, 215' of injection manifold 260 that surrounds its respective melt outlet 229, with each nozzle seal 244 otherwise not being directly attached or secured to the injection manifold assembly 102. The slidable interface between nozzle seal 244 and injection manifold 260 permits some misalignment between a melt inlet 241a of nozzle tip 240 and melt outlet 229 of injection manifold 260 in a cold condition. However as the edge-gated injection molding apparatus 100 is heated to an operating temperature, the upstream surfaces 241, 243 of nozzle tip 240 and primary seal component 242b of gate seal 242, respectively, are slidable along outside surface 215, 215' of injection manifold 260 during thermal expansion of the components to substantially eliminate any misalignment between nozzle tip melt inlet 241a and injection manifold melt outlet 229 under operating conditions. Accordingly when used in linearly arranged edge-gated molding applications in accordance with embodiments hereof, the slidable interface between melt inlets 241a of nozzle seals 244 and melt outlets 229 of injection manifold assemblies 102 permits thermal expansion of the injection manifold assemblies with respect to the nozzle seals in both longitudinal and transverse directions without damaging the nozzle seals or adversely affecting alignment between the nozzle seals and their respective mold cavities.

Figure 5A:
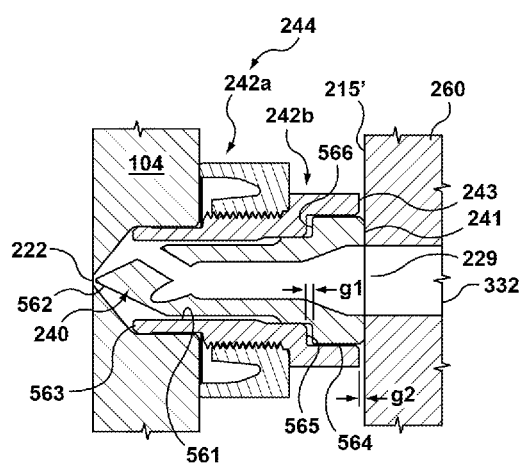
FIGS. 5A and 5B are further enlarged sectional views of a nozzle seal area shown in FIG. 2A depicting a nozzle seal with and without a sealing load in accordance with an embodiment hereof.
Figure 5B:
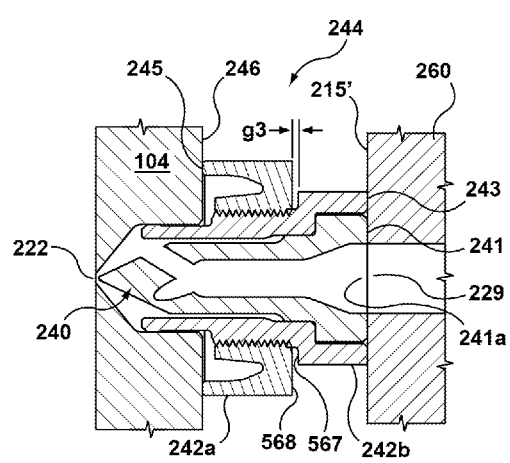

FIGS. 5A and 5B are further enlarged sectional views of nozzle seal 244 as depicted in FIG. 2A, with FIG. 5A illustrating a configuration of nozzle seal 244 after initial assembly and with FIG. 5B illustrating a configuration of nozzle seal 244 for applying a sealing preload in accordance with an embodiment hereof. Nozzle tip 240 is disposed coaxially within two-piece gate seal 242. More particularly with reference to FIG. 5A, after initial assembly of nozzle seal 244 between cavity insert 104 and injection manifold 260, nozzle tip 240 extends within a stepped bore 561 of primary seal component 242b such that a tip 562 of nozzle tip 240 extends from a downstream end 563 of primary seal component 242b and a flange 564 of nozzle tip 240 is received within stepped bore 561 of primary seal component 242b. In the initial assembly configuration of FIG. 5A, a downstream surface 566 of nozzle tip flange 564 does not seat against an annular surface 565 of stepped bore 561 such that the gap "$g_1$" exists therebetween. As well upstream surface 243 of primary seal component 242b does not seat against side surface 215' of injection manifold 260 in the initial assembly configuration of FIG. 5A, such that the gap "$g_2$" exists therebetween. In an embodiment, gaps $g_1$ and $g_2$ may be substantially equal.

As described above, face seal component 242a and primary seal component 242b of the gate seal 242 are threadably coupled to each other. In preparation for operation, a preload is applied to nozzle seal 244 by rotating one of face seal component 242a and primary seal component 242b relative to the other in a first direction so as to back-out or move in an upstream direction primary seal component 242b with respect to face seal component 242a until at least gap $g_1$ is eliminated, such that flange downstream surface 566 of nozzle tip 240 seats against annular surface 565 of stepped bore 561 and upstream surface 241 of nozzle tip 240 seals against side surface 215' of injection manifold assembly 260 to provide a seal therebetween as shown in FIG. 5B. With gap $g_1$ eliminated, continued relative rotation between the gate seal components in the first direction may also eliminate or reduce gap $g_2$, if $g_2$ is eliminated a sealing preload is created between at least upstream surface 243 of primary seal component 242b and side surface 215' of injection manifold assembly 260. Elimination of $g_1$ further provides a sealing force between face seal surface 245 of face seal component 242a and first sealing surface 246 of cavity insert 104. Further, a gap $g_3$ will open up between an upstream surface 568 of face seal component 242a and a downstream annular surface 567 of primary seal component 242b, wherein a width of gap $g_3$ will depend on the sealing preload being applied. In an embodiment, in the cold condition, upstream surface 241 of nozzle tip 240 may still extend or project from upstream surface 243 of primary seal component 242b such that gap $g_2$ is not entirely eliminated during application of the sealing preload described above, with any space left therebetween being eliminated upon heat expansion of the components to further concentrate sealing forces at the melt outlet 229 and nozzle tip melt inlet 241a.

Figure 6:
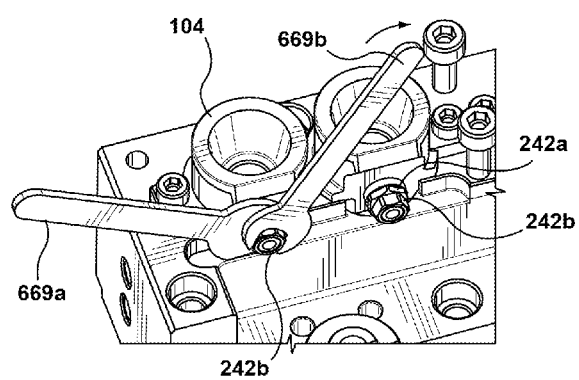
FIG. 6 is a perspective bottom or downstream view of a portion of the injection molding apparatus shown in FIG. 1 with an injection manifold assembly removed in accordance with an embodiment hereof.

FIG. 6 is a perspective bottom or downstream view of a portion of the injection molding apparatus shown in FIG. 1 with injection manifold assembly 102 removed in accordance with an embodiment hereof. It would be understood by one of ordinary skill in the art that relative rotation of face seal component 242a with respect to primary seal component 242b may occur by holding one of the gate seal components stationary while rotating the other gate seal component relative thereto. As shown with reference to FIG. 6, a cone wrench 669a may be used to hold a position of face seal component 242a while a cone wrench 669b is rotated clockwise to rotate primary seal component 242b relative to face seal component 242a until an adequate sealing preload is applied as discussed above. It would also be understood by one of ordinary skill in the art that the direction of rotation may be clockwise or counter-clockwise depending on the direction of the threaded engagement between the seal components and on which seal component is being rotated and which is being held stationary. In an embodiment, face seal component 242a and primary seal component 242b of the gate seal 242 are accessible from a parting line $P_L$ of the mold upon removal of cover plate 318b such that this configuration permits an operator to more conveniently apply a preload after assembly of the remainder of edge-gated injection molding apparatus 100. In another embodiment, edge-gated injection molding apparatus 100 may be brought to an operating temperature and thereafter a preload may be applied, as discussed above, from the parting line $P_L$ of the mold.

Figure 7:
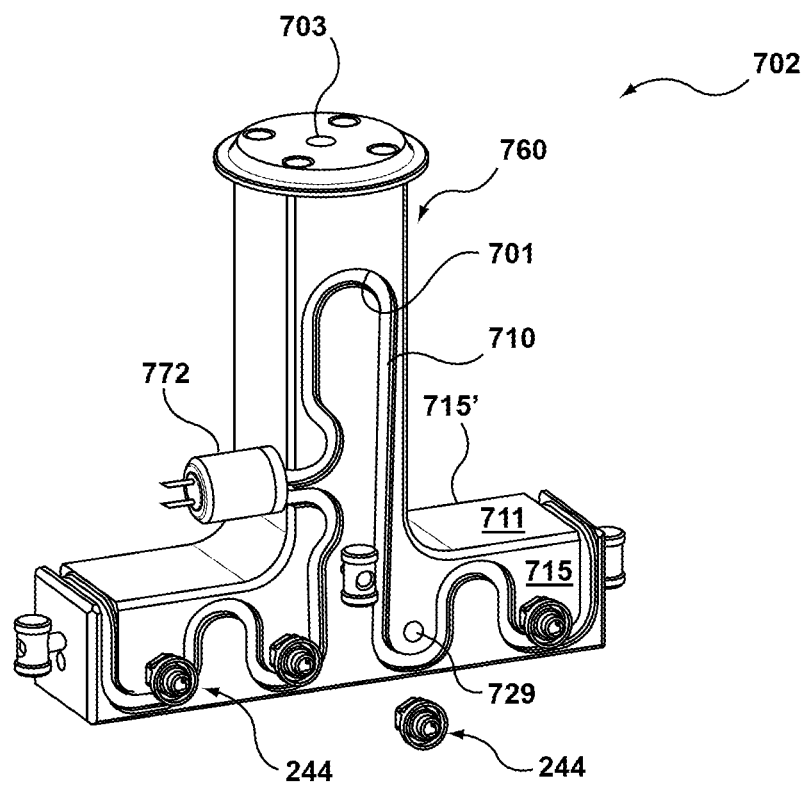
FIG. 7 is a perspective view of an injection manifold assembly in accordance with another embodiment hereof.
Figure 8:
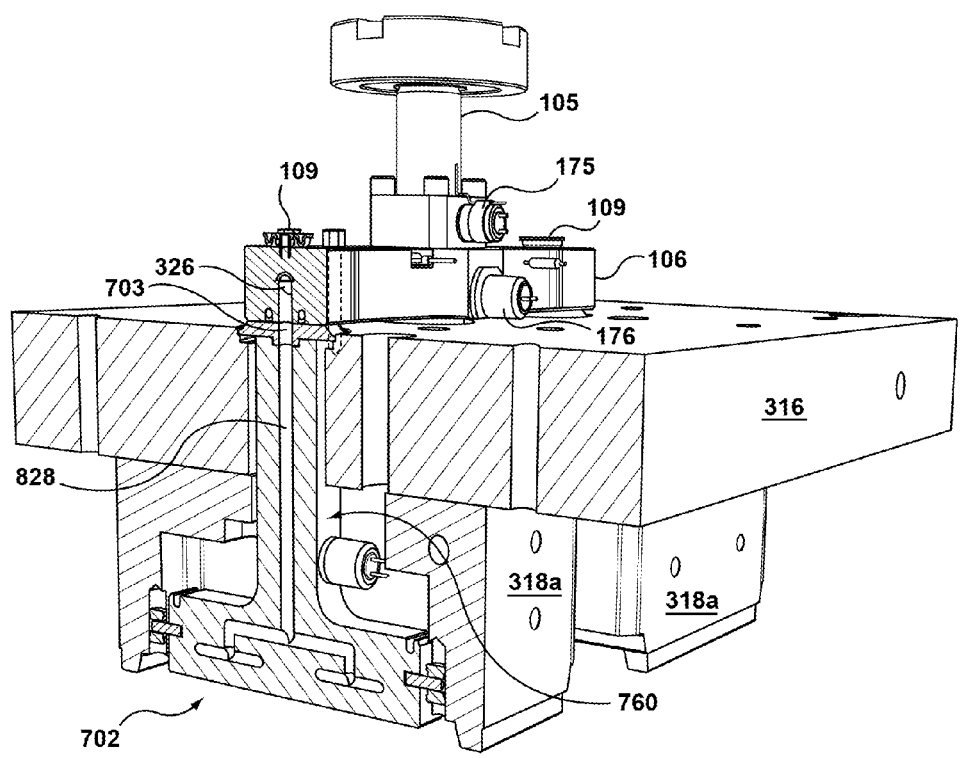
FIG. 8 is a partial sectional view of the injection manifold assembly of FIG. 7 installed in an edge-gated injection molding apparatus in accordance with another embodiment hereof.

FIG. 7 is a perspective view of an edge-gated injection manifold assembly 702 in accordance with another embodiment hereof that shares features with edge-gated injection manifold assembly 202 of FIG. 2. The embodiment of FIG. 7 may be used with all features described with reference to other embodiments hereof and only features that differ from those already described will be detailed herein. Injection manifold assembly 702 includes a T-shaped injection manifold 760 that has a continuous groove 701 formed within its upstream surface 711 and opposing side surfaces 715, 715' for receiving a heating element 710 of a heater 772. Injection manifold 760 may be used in place of injection molding nozzle 108, telescopic connector 380 and injection manifold 260 in injection molding apparatus 100, which was described with reference to FIGS. 1 and 3. In this embodiment, the T shaped injection manifold 760 is bolted to manifold 106 at an upstream end 703 thereof. With injection manifold assembly 702 so installed in injection molding apparatus 100 as shown in FIG. 8, a melt inlet at upstream end 703 of injection manifold 760 is configured for transferring a melt stream of moldable material received from melt channel 326 of hot runner manifold 106 through a series of melt channels 828 of injection manifold 760 to a plurality of melt outlets 729 aligned along opposing side surfaces 715, 715' of injection manifold 760.

As similarly described with reference to the embodiments above, each melt outlet 729 of injection manifold 760 is in fluid communication with a nozzle seal 244 for injecting the melt stream into a mold cavity of a respective cavity insert during a molding cycle. Each nozzle seal 244 has an upstream end that is slidably disposed against the side surface 715, 715' that surrounds melt outlet 729 of injection manifold 760 associated therewith and has a downstream end that is receivable within a corresponding bore that is coaxial with a mold gate of the respective mold cavity associated therewith, as described with reference to the previous embodiment. In this manner, the downstream end of primary seal component 242b of nozzle seal 244 seals on an outer circumferential surface within the counter bore that leads to its respective mold gate and assures axial alignment of nozzle tip 240 with the mold gate under both cold and hot conditions. As in the previous embodiment, the slidable interface between nozzle seal 244 and injection manifold 760 permits some misalignment between a melt inlet 241a of nozzle tip 240 and its respective melt outlet 729 of injection manifold 760 in a cold condition. However as edge-gated injection manifold assembly 702 is heated to an operating temperature, the upstream surfaces 241, 243 of nozzle tip 240 and primary seal component 242b of gate seal 242, respectively, are slidable along outside surface 715, 715' of injection manifold 760 during thermal expansion of the components to substantially eliminate any misalignment between nozzle tip melt inlet 241a and its respective injection manifold melt outlet 729 under operating conditions. Accordingly when used in linearly arranged edge-gated molding applications in accordance with embodiments hereof, the slidable interface between melt inlets 241a of nozzle seals 244 and melt outlets 729 of injection manifold assemblies 702 permits thermal expansion of the injection manifold assemblies with respect to the nozzle seals in both longitudinal and transverse directions without damaging the nozzle seals or adversely affecting alignment between the nozzle seals and their respective mold cavities.

As in the previous embodiment, a sealing preload may be applied to each of nozzle seals 244 by rotating one of the face seal components 242a and the primary seal components 242b relative to the other. With such a sealing preload applied melt leakage is prevented at the interface between each nozzle seal 244 and injection manifold 760 under operating conditions. In the embodiment of FIG. 7, face seal component 242a and primary seal component 242b of the gate seal 242 are accessible from a parting line $P_L$ of the mold such that this configuration also permits an operator to more conveniently apply a preload after assembly of the remainder of edge-gated injection molding apparatus 100. In another embodiment, edge-gated injection molding apparatus 100 that includes injection manifold assembly 702 may be brought to an operating temperature and thereafter a preload may be applied, as discussed above, from the parting line $P_L$ of the mold.

Figure 9:
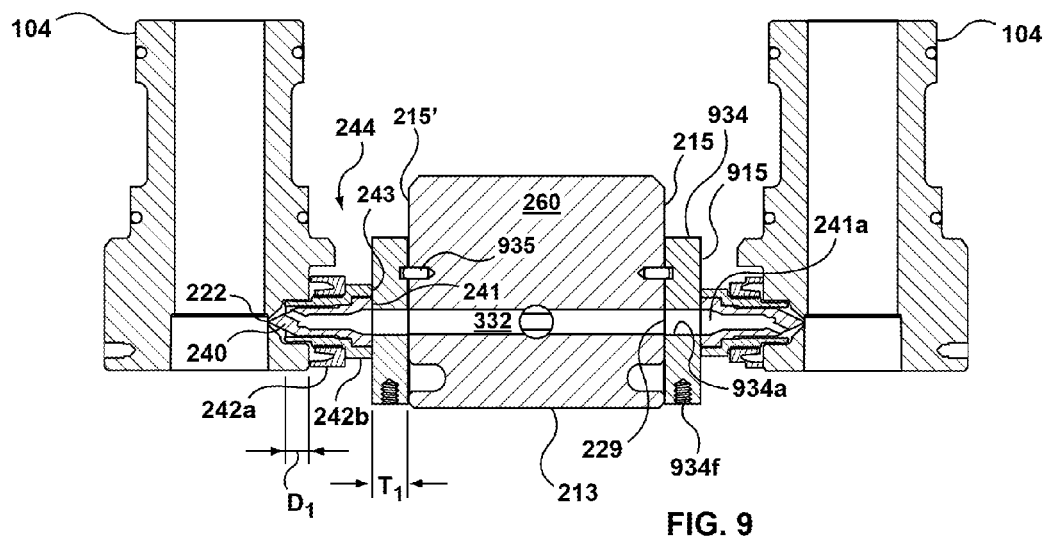
FIG. 9 is an enlarged sectional view of the injection manifold assembly of FIG. 2 taken along line A-A of FIG. 2, with the injection manifold assembly shown installed within the injection molding apparatus of FIGS. 1 and 3 in accordance with another embodiment hereof.
Figure 9A:
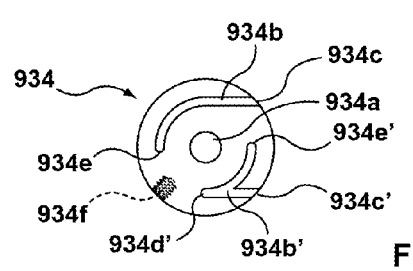
FIG. 9A is a top view of a nozzle seal spacer in accordance with an embodiment hereof.

FIG. 9 is an enlarged sectional view of the injection manifold assembly 102 taken along line A-A of FIG. 2, wherein the injection manifold assembly is depicted as installed within a portion of injection molding apparatus 100 as shown in FIG. 3 in accordance with another embodiment hereof. FIG. 9A depicts a top view of a nozzle seal spacer 934 in accordance with an embodiment hereof. The embodiment of FIGS. 9 and 9A may be used with all features described with reference to other embodiments hereof and only features that differ from those already described will be detailed herein. With reference to FIGS. 9 and 9A, nozzle seal spacers 934 are shown positioned between upstream surfaces 241, 243 of nozzle tip 240 and primary seal component 242b and respective side surface 215, 215' of injection manifold 260 with melt bores 934a of nozzle seal spacers 934 fluidly connecting a respective melt outlet 229 of injection manifold 260 with an associated melt inlet 241a of nozzle tip 240. Nozzle seal spacers 934 are installed between a respective nozzle seal 244 and an outlet 229 of injection manifold 260 after a downstream end of primary seal component 242b of nozzle seal 244 is inserted within the counter bore of cavity insert 104 that leads to its mold gate 222. Nozzle seal spacer 934 so positioned fills-in a requisite installation gap between an upstream end of the nozzle seal and the injection manifold that is needed to allow room for assembly and disassembly of the nozzle seal from a parting line of the edge-gated injection molding apparatus.

Nozzle seal spacer 934 includes grooves 934b, 934b' in a surface thereof for slidably engaging corresponding dowels 935 that are positioned to extend from a respective side surface 215, 215' of injection manifold 260 proximate an outlet 229 thereof. An open end 934c, 934c' of each groove 934b, 934b' is slid onto a respective dowel 935 until the dowel within groove 934b' engages a stop 934d' of groove 934b'. Thereafter, nozzle seal spacer 934 is rotated via engagement of a tool (not shown) in threaded hole 934f until the dowels in each groove 934b, 934b' abut respective ends 934e, 934e' thereof, which substantially "locks" nozzle seal spacer 934 in position between nozzle seal 244 and injection manifold outlet 229 and assures proper alignment of melt bore 934a thereof with injection manifold melt outlet 229. Reversing these steps will permit nozzle seal spacers 934 to be disengaged from dowels 935 and removed from between a respective nozzle seal 244 and injection manifold outlet 229.

In the embodiment shown in FIGS. 9 and 9A, nozzle seal spacer 934 has a cylindrical or disc-shaped body with a thickness $T_1$ that is substantially equal to or slightly greater than a distance $D_1$ that primary seal component 242b of gate seal 242 extends into the counter bore of cavity insert 104 that is coaxial with its mold gate 222. Such a thickness $T_1$ of nozzle seal spacer 934 must be equal to or greater than an installation gap that is required to manipulate nozzle seal 244 into and out of the counter bore that leads to its mold gate 222 from a parting line of the mold after the remainder of the edge-gated injection molding apparatus has been assembled.

An upstream surface 243 of primary seal component 242b and an upstream surface 241 of nozzle tip 240 are slidably disposed against a downstream surface 915 of nozzle seal spacer 934, with each nozzle seal 244 otherwise not being directly attached or secured thereto. The slidable interface between nozzle seal 244 and nozzle seal spacer 934 permits some misalignment between a melt inlet 241a of nozzle tip 240 and melt bore 934a in a cold condition. However as the edge-gated injection molding apparatus is heated to an operating temperature, the upstream surfaces 241, 243 of nozzle tip 240 and primary seal component 242b, respectively, are slidable along downstream surface 915 of nozzle seal spacer 934 during thermal expansion of the components to substantially eliminate any misalignment between nozzle tip melt inlet 241a and melt bore 934a under operating conditions. Accordingly when used in linearly arranged edge-gated molding applications in accordance with embodiments hereof, the slidable interface between melt inlets 241a of nozzle seals 244 and melt bore 934a of nozzle seal spacer 934 permits thermal expansion of the injection manifold assemblies with respect to the nozzle seals in both longitudinal and transverse directions without damaging the nozzle seals or adversely affecting alignment between the nozzle seals and their respective mold cavities.

As described in detail above with reference to the embodiment of FIGS. 5A and 5B, face seal component 242a and primary seal component 242b of nozzle seal 244 are threadably coupled to each other such that relative rotation therebetween in a first direction moves primary seal component 242b away from face seal component 242a to apply a sealing preload between the components shown in FIG. 9 and such that relative rotation therebetween in a reverse direction returns the nozzle seal to a looser installation configuration, as shown in FIG. 9, in which primary seal component 242b is drawn further within face seal component 242a such that the upstream end 243 of primary seal component 242b is spaced from downstream surface 915 of nozzle seal spacer 934.

Figure 10:
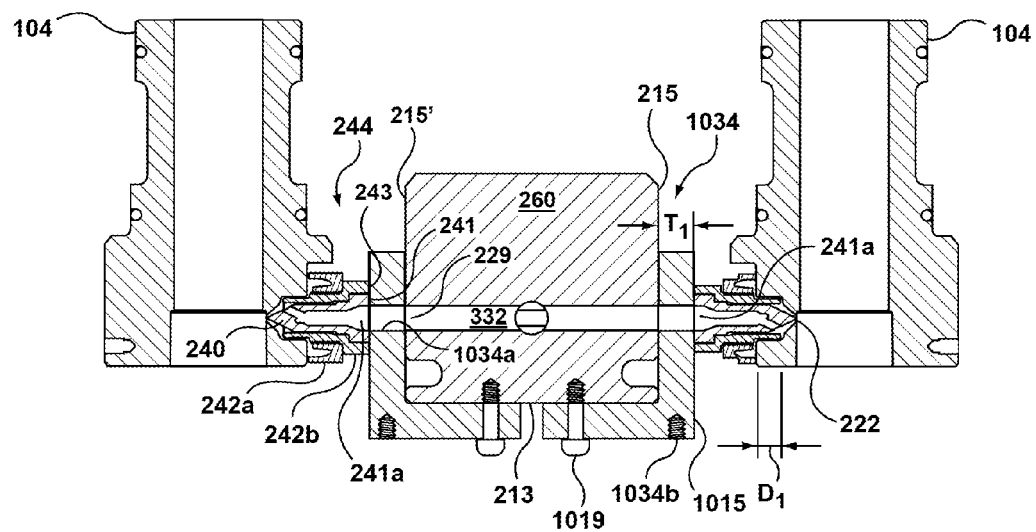
FIG. 10 is an enlarged sectional view of the injection manifold assembly of FIG. 2 taken along line A-A of FIG. 2, with the injection manifold assembly shown installed within the injection molding apparatus of FIGS. 1 and 3 in accordance with another embodiment hereof.

FIG. 10 is an enlarged sectional view of injection manifold assembly 102 taken along line A-A of FIG. 2, wherein the injection manifold assembly is depicted as installed within a portion of injection molding apparatus 100 as shown in FIG. 3, in accordance with another embodiment hereof. The embodiment of FIG. 10 may be used with all features described with reference to other embodiments hereof and only features that differ from those already described will be detailed herein. L-shaped nozzle seal spacers 1034 are shown in FIG. 10 positioned between upstream surfaces 241, 243 of nozzle tip 240 and primary seal component 242b and respective side surface 215, 215' of injection manifold 260 with melt bores 1034a of L-shaped nozzle seal spacers 1034 fluidly connecting a respective melt outlet 229 of injection manifold 260 with an associated melt inlet 241a of nozzle tip 240. L-shaped nozzle seal spacers 1034 are installed between a respective nozzle seal 244 and an outlet 229 of injection manifold 260 after a downstream end of primary seal component 242b of nozzle seal 244 is inserted within the counter bore of cavity insert 104 that is coaxial with its mold gate 222. L-shaped nozzle seal spacer 1034 so positioned fills-in a requisite installation gap between an upstream end of the nozzle seal and the injection manifold that is needed to allow room for assembly and disassembly of the nozzle seal from a parting line of the edge-gated injection molding apparatus.

A base of each L-shaped nozzle seal spacer 1034 is secured by one or more screws 1019 to a downstream surface 213 of injection manifold 260 so that melt bore 1034a thereof is aligned with injection manifold melt outlet 229. The base of each L-shaped nozzle seal spacer 1034 further includes a threaded hole 1034b for engagement with a tool (not shown) to facilitate installation and removal of L-shaped nozzle spacer. L-shaped nozzle seal spacer 1034 has a thickness $T_1$ that is substantially equal to or slightly greater than a distance $D_1$ that primary seal component 242b of gate seal 242 extends in a cold condition into the counter bore of cavity insert 104 that leads to its mold gate 222. Such a thickness $T_1$ of L-shaped nozzle seal spacer 1034 must be equal to or greater than an installation gap that is required to manipulate nozzle seal 244 into and out of the counter bore of its mold gate 222 from a parting line of the mold after the remainder of the edge-gated injection molding apparatus has been assembled.

An upstream surface 243 of primary seal component 242b and an upstream surface 241 of nozzle tip 240 are slidably disposed against a downstream surface 1015 of L-shaped nozzle seal spacer 1034, with each nozzle seal 244 otherwise not being directly attached or secured thereto. The slidable interface between nozzle seal 244 and L-shaped nozzle seal spacer 1034 permits some misalignment between a melt inlet 241a of nozzle tip 240 and melt bore 1034a in a cold condition. However as the edge-gated injection molding apparatus is heated to an operating temperature, the upstream surfaces 241, 243 of nozzle tip 240 and primary seal component 242b, respectively, are slidable along upstream surface 1015 of L-shaped nozzle seal spacer 1034 during thermal expansion of the components to substantially eliminate any misalignment between nozzle tip melt inlet 241a and melt bore 1034a under operating conditions. Accordingly when used in linearly arranged edge-gated molding applications in accordance with embodiments hereof, the slidable interface between melt inlets 241a of nozzle seals 244 and melt bore 1034a of L-shaped nozzle seal spacer 1034 permits thermal expansion of the injection manifold assemblies with respect to the nozzle seals in both longitudinal and transverse directions without damaging the nozzle seals or adversely affecting alignment between the nozzle seals and their respective mold cavities.

As described in detail above with reference to the embodiment of FIGS. 5A and 5B, face seal component 242a and primary seal component 242b of nozzle seal 244 are threadably coupled to each other such that relative rotation therebetween in a first direction moves primary seal component 242b away from face seal component 242a to apply a sealing preload between the components shown in FIG. 10 and such that relative rotation therebetween in a reverse direction returns the nozzle seal to a looser installation configuration, as shown in FIG. 10, in which primary seal component 242b is drawn further within face seal component 242a such that the upstream end 243 of primary seal component 242b is spaced from downstream surface 1015 of L-shaped nozzle seal spacer 1034. In an embodiment (not shown), downstream face 1015 of L-shaped nozzle seal spacer 1034 may be provided with a slotted projection that mates with a hex profile of primary seal component 242b to hold the seal component stationary during the relative rotation of face seal component 242a. In this embodiment, the sealing preload may be applied to each nozzle seal 244 using one wrench instead of two, as would be apparent to one of ordinary skill in the art, form a parting line of the mold.

Figure 11:
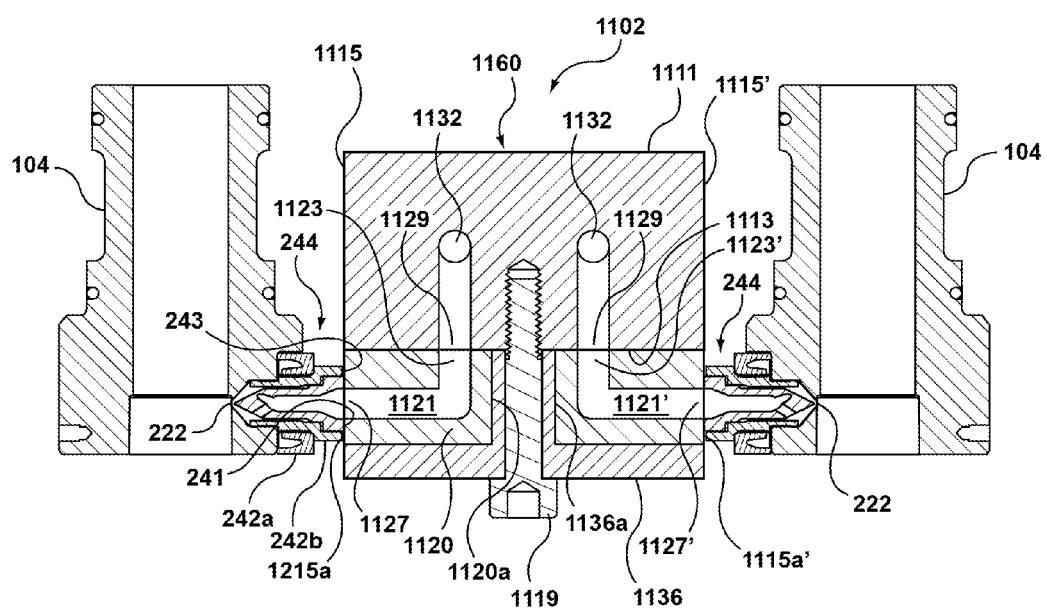
FIG. 11 is an enlarged sectional view of the injection manifold assembly of FIG. 2 taken along line A-A of FIG. 2, with the injection manifold assembly shown installed within the injection molding apparatus of FIGS. 1 and 3 in accordance with another embodiment hereof.
Figure 11A:
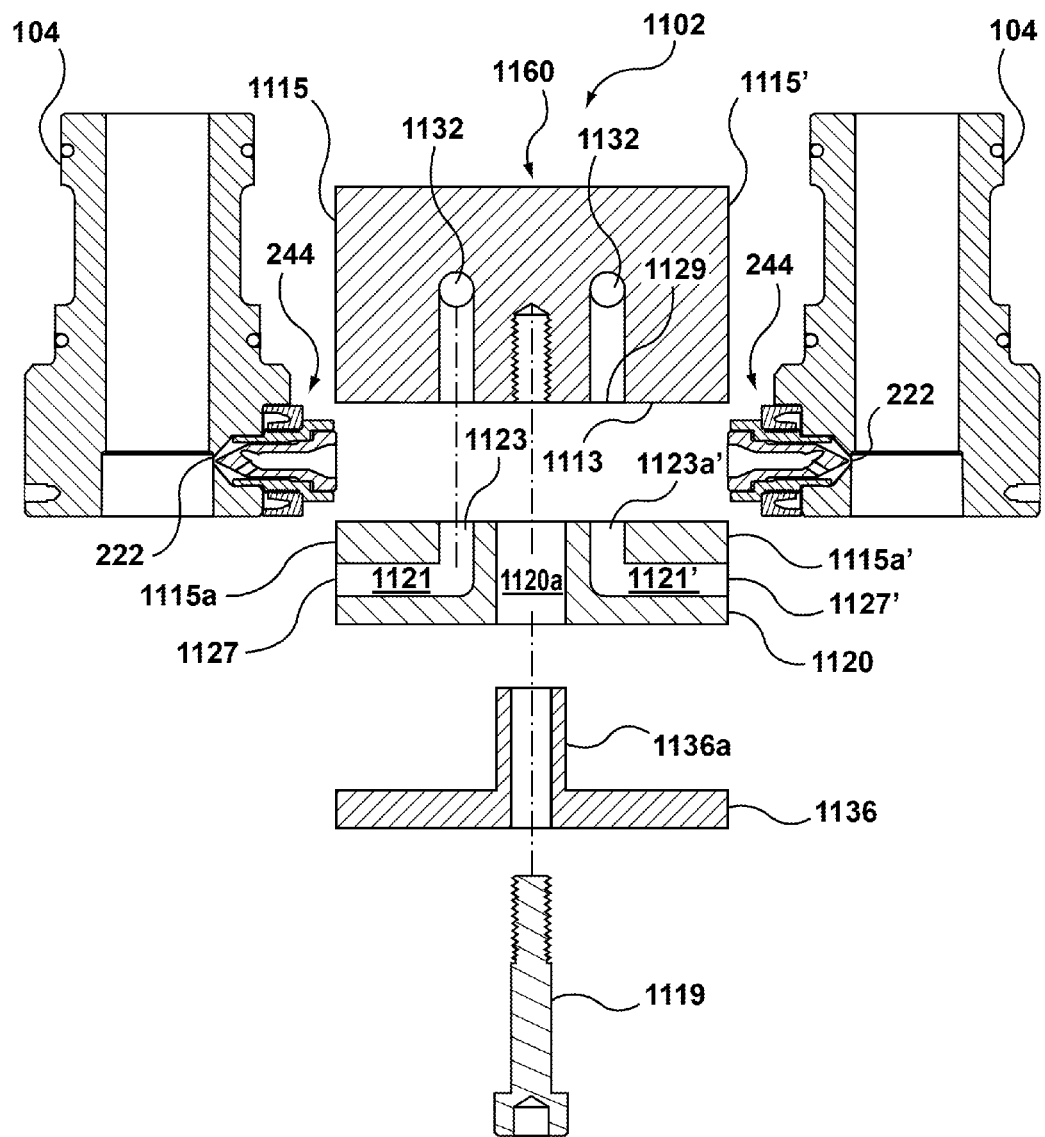
FIGS. 11A and 11B illustrate the embodiment of FIG. 11 partially disassembled.
Figure 11B:
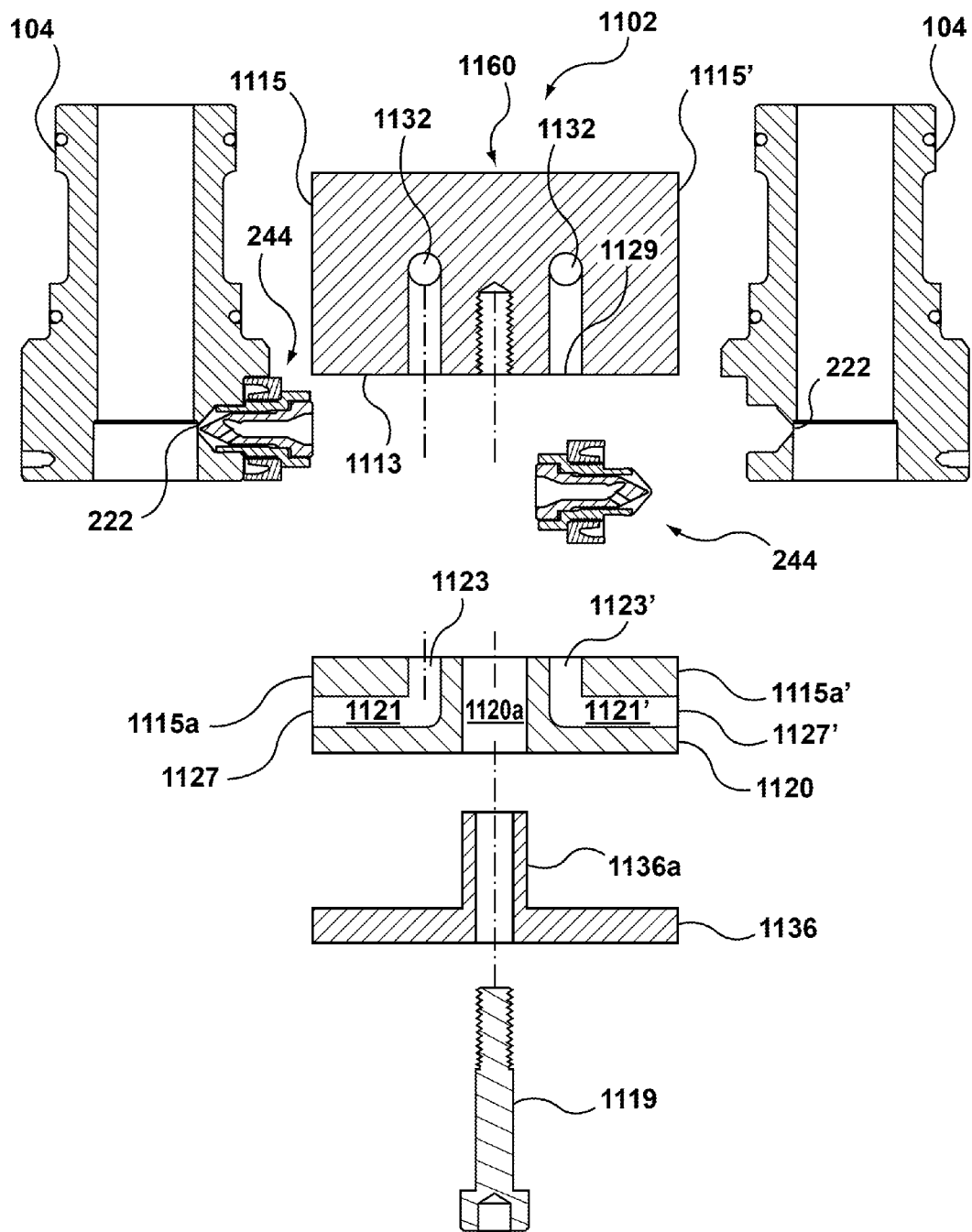

FIG. 11 is an enlarged sectional view of injection manifold assembly 102 taken along line A-A of FIG. 2, wherein the injection manifold assembly is depicted as installed within a portion of injection molding apparatus 100 as shown in FIG. 3, in accordance with another embodiment hereof with FIGS. 11A and 11B illustrating the embodiment of FIG. 11 partially disassembled. FIG. 11 depicts an edge-gated injection manifold assembly 1102 for distributing a melt stream of moldable material to a plurality of mold cavities aligned on opposing sides of the injection manifold assembly in accordance with another embodiment hereof that may be used with all features described with reference to other embodiments hereof such that only features that differ from those already described will be detailed herein. Injection manifold assembly 1102 has an injection manifold 1160 that defines an upstream surface 1111, a downstream surface 1113, opposing side surfaces 1115, 1115' and opposing end surfaces (not shown) with a heating element of a heater (not shown) within a continuous groove formed in the surfaces thereof as similarly described above.

Injection manifold 1160 includes melt channel 1132 formed therein for receiving a melt stream of moldable material, as described above, and distributing the melt stream via a plurality of melt outlets 1129 in downstream surface 1113 to a plurality of diverter blocks 1120, each of which directs the melt stream to a pair of opposing cavity inserts 104. Each diverter block 1120 includes two melt inlets 1123, 1123' and two melt outlets 1127, 1127' with a segment of melt channel 1121, 1121' extending between each inlet and outlet. Each diverter block 1120 includes a central bore 1120*a* for receiving a spigot 1136*a* of a respective clamping plate 1136 therethrough. Each diverter block 1120 is individually coupled to injection manifold downstream surface 1113 by a cap screw 1119 that extends through clamping plate spigot 1136*a* to be threaded within a corresponding bore of injection manifold 1160, such that each diverter block melt inlet 1123, 1123' is aligned with a respective injection manifold melt outlet 1129. Additional threaded fasteners may be used between clamping plate 1136 and injection manifold 1160 to assure that diverter block 1120 is securely held against a downstream surface of the injection manifold under operating conditions to prevent leakage therebetween, as would be apparent to one of ordinary skill in the art. Dowels may also be used between injection manifold 1160 and diverter blocks 1120 to aid in aligning melt outlets 1129 and with a corresponding melt inlet 1123, 1123' during assembly as well as to maintain alignment therebetween during thermal expansion that occurs as the system is brought to an operating temperature. In an embodiment (not shown) each of diverter blocks 1120 may be provided with a heater.

Opposing outside surfaces 1115*a*, 1115*a*' of each diverter block 1120, each of which includes a diverter block melt outlet 1127, 1127', are substantially parallel to respective opposing side surface 1115, 1115' of injection manifold 1160. In the embodiment shown in FIG. 11, each diverter block melt channels 1121, 1121' includes a substantially 90° bend for directing the melt stream received through its respective diverter block melt inlet 1123, 1123' in an upstream surface thereof to its respective diverter block melt outlet 1127, 1127' in side surface 1115*a*, 1115*a*' thereof.

Nozzle seals 244 are positioned to receive the melt stream from a respective melt outlet 1127, 1127' of diverter block 1120 and direct the melt stream into a respective mold cavity in fluid communication therewith. An upstream surface 243 of primary seal component 242*b* and an upstream surface 241 of nozzle tip 240 are slidably disposed against a respective side surface 1115, 1115' of diverter block 1120, with each nozzle seal 244 otherwise not being directly attached or secured thereto. Accordingly, nozzle seal 244 function to accommodate thermal expansion of the components of edge-gated injection manifold assembly 1102 as previously described above with reference to the previous embodiments. As also described in detail above with reference to the embodiment of FIGS. 5A and 5B, face seal component 242*a* and primary seal component 242*b* of nozzle seal 244 are threadably coupled to each other such that relative rotation therebetween in a first direction moves primary seal component 242*b* away from face seal component 242*a* to apply a sealing preload between the components shown in FIG. 11 and such that relative rotation therebetween in a reverse direction returns the nozzle seal to a looser unloaded configuration, as shown in FIG. 11, in which primary seal component 242*b* is drawn further within face seal component 242*a* such that the upstream end 243 of primary seal component 242*b* is spaced from its respective side surface 1115, 1115' of diverter block 1120. In the embodiment of FIG. 11, a sealing preload may be conveniently applied to each nozzle seal 244 from a parting line of the mold.

With reference to FIGS. 11A and 11B, edge-gated injection manifold assembly 1102 may be partially disassembled from a parting line of the mold in order to provide access to nozzle seals 244 without complete disassembly of the mold and/or removal of cavity insert 104. In this manner, nozzle seals 244 may be removed and replaced, if necessary, between injection molding cycles without significant downtime.

Figure 12:
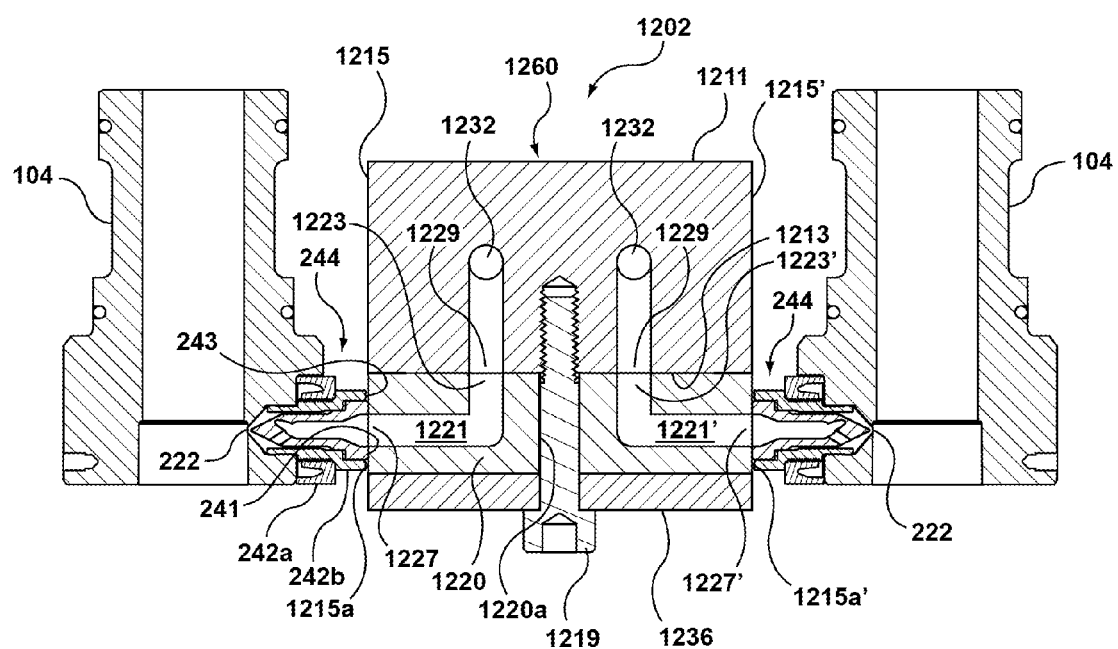
FIG. 12 is an enlarged sectional view of the injection manifold assembly of FIG. 2 taken along line A-A of FIG. 2, with the injection manifold assembly shown installed within the injection molding apparatus of FIGS. 1 and 3 in accordance with another embodiment hereof.
Figure 12A:
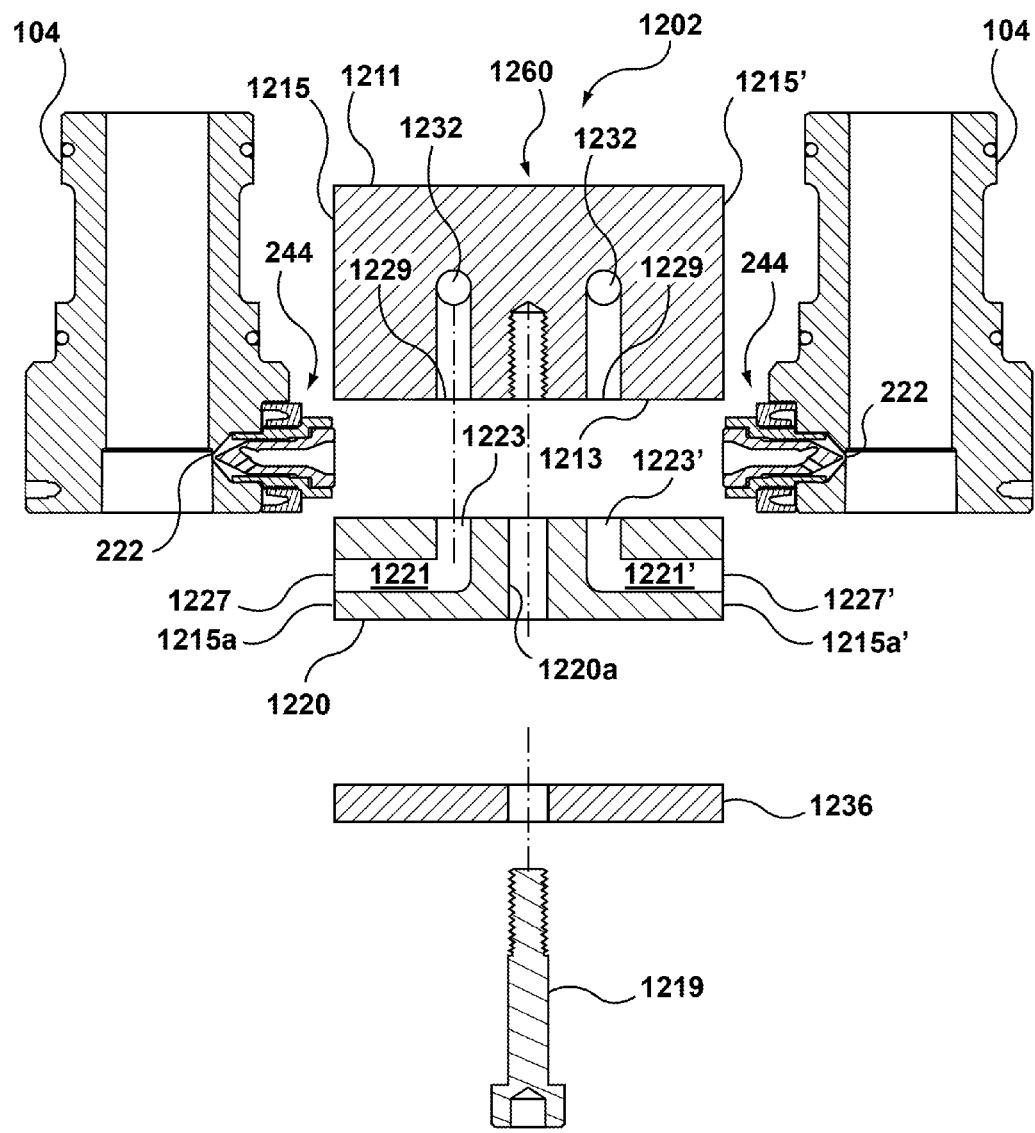
FIGS. 12A and 12B illustrate the embodiment of FIG. 12 partially disassembled.
Figure 12B:
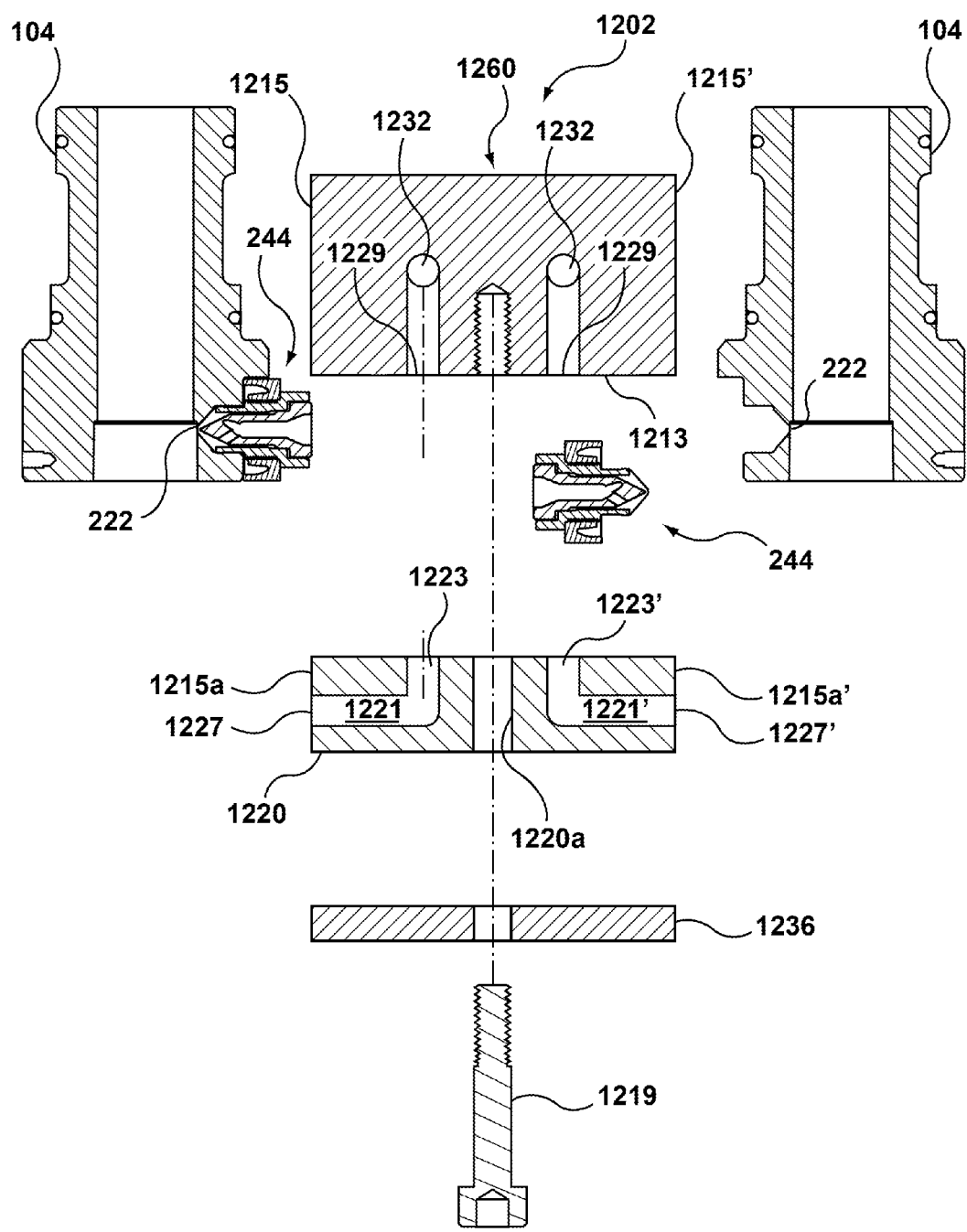

FIG. 12 is an enlarged sectional view of injection manifold assembly 102 taken along line A-A of FIG. 2, wherein the injection manifold assembly is depicted as installed within a portion of injection molding apparatus 100 as shown in FIG. 3, in accordance with another embodiment hereof with FIGS. 12A and 12B illustrating the embodiment of FIG. 12 partially disassembled. FIG. 12 depicts an edge-gated injection manifold assembly 1202 for distributing a melt stream of moldable material to a plurality of mold cavities aligned on opposing sides of the injection manifold assembly in accordance with another embodiment hereof that may be used with all features described with reference to other embodiments hereof such that only features that differ from those already described will be detailed herein. Injection manifold assembly 1202 has an injection manifold 1260 that defines an upstream surface 1211, a downstream surface 1213, opposing side surfaces 1215, 1215' and opposing end surfaces (not shown) with a heating element of a heater (not shown) within a continuous groove formed in the surfaces thereof as similarly described above.

Injection manifold 1260 includes melt channel 1232 formed therein for receiving a melt stream of moldable material, as described above, and distributing the melt stream via a plurality of melt outlets 1229 in downstream surface 1213 to a plurality of diverter blocks 1220, each of which directs the melt stream to a pair of opposing cavity inserts 104. Each diverter block 1220 includes two melt inlets 1223, 1223' and two melt outlets 1227, 1127' with a segment of melt channel 1221, 1221' extending between each inlet and outlet. Each diverter block 1220 includes a central bore 1220*a* for receiving a cap screw 1219 therethrough. Each diverter block 1220 is individually coupled to injection manifold downstream surface 1213 by a clamping plate 1236 that is held against diverter block 1220 by cap screw 1219, when the cap screw is threadably engaged within a corresponding bore of injection manifold 1260. When installed in such a manner, each diverter block melt inlet 1223, 1223' is aligned with a respective injection manifold melt outlet 1229. Additional threaded fasteners may be used between clamping plate 1236 and injection manifold 1260 to assure that diverter block 1220 is securely held against a downstream surface of the injection manifold under operating conditions to prevent leakage therebetween, as would be apparent to one of ordinary skill in the art. Dowels may also be used between injection manifold 1260 and diverter blocks 1220 to aid in aligning melt outlets 1229 and with a corresponding melt inlet 1223, 1223' during assembly as well as to maintain alignment therebetween during thermal expansion that occurs as the system is brought to an operating temperature.

Opposing outside surfaces 1215a, 1215a' of each diverter block 1220, each of which includes a diverter block melt outlet 1227, 1227', are substantially parallel to respective opposing side surface 1215, 1215' of injection manifold 1260. In the embodiment shown in FIG. 12, each diverter block melt channels 1221, 1221' includes a substantially 90° bend for directing the melt stream received through its respective diverter block melt inlet 1223, 1223' in an upstream surface thereof to its respective diverter block melt outlet 1227, 1227' in side surface 1215a, 1215a' thereof.

Nozzle seals 244 are positioned to receive the melt stream from a respective melt outlet 1227, 1227' of diverter block 1220 and direct the melt stream into a respective mold cavity in fluid communication therewith. An upstream surface 243 of primary seal component 242b and an upstream surface 241 of nozzle tip 240 are slidably disposed against a respective side surface 1215, 1215' of diverter block 1220, with each nozzle seal 244 otherwise not being directly attached or secured thereto. Accordingly, nozzle seal 244 functions to accommodate thermal expansion of the components of edge-gated injection manifold assembly 1202 as previously described above with reference to the previous embodiments. As also described in detail above with reference to the embodiment of FIGS. 5A and 5B, face seal component 242a and primary seal component 242b of nozzle seal 244 are threadably coupled to each other such that relative rotation therebetween in a first direction moves primary seal component 242b away from face seal component 242a to apply a sealing preload between the components shown in FIG. 12 and such that relative rotation therebetween in a reverse direction returns the nozzle seal to a looser unloaded configuration, as shown in FIG. 12, in which primary seal component 242b is drawn further within face seal component 242a such that the upstream end 243 of primary seal component 242b is spaced from its respective side surface 1215, 1215' of diverter block 1220. In the embodiment of FIG. 12, a sealing preload may be conveniently applied to each nozzle seal 244 from a parting line of the mold.

With reference to FIGS. 12A and 12B, edge-gated injection manifold assembly 1202 may be partially disassembled from a parting line of the mold in order to provide access to nozzle seals 244 without complete disassembly of the mold and/or removal of cavity insert 104. In this manner, nozzle seals 244 may be removed and replaced, if necessary, between injection molding cycles without significant downtime.

FIGS. 13-17 are sectional views of downstream portions of various edge-gated injection molding apparatus for distributing a melt stream of moldable material to a plurality of mold cavities aligned on opposing sides of the injection manifold assemblies shown therein in accordance with other embodiments hereof. Each edge-gated injection molding apparatus depicted in FIGS. 13-17 utilizes nozzle seals 244 as discussed in detail above for applying a sealing preload to the components thereof and for accommodating thermal expansion of the respective edge-gated injection manifold assemblies thereof such that these features will not be further described in detail with reference to the embodiments of FIGS. 13-17.

Figure 13:
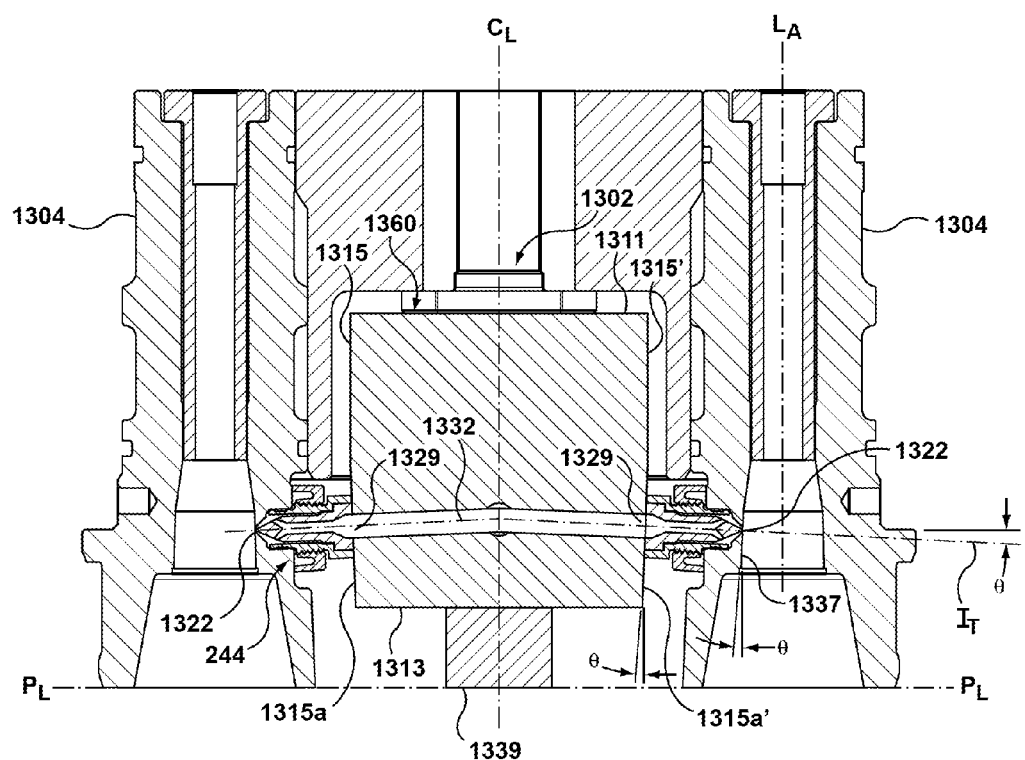
FIGS. 13-17 are sectional views of downstream portions of various edge-gated injection molding apparatus in accordance with other embodiments hereof.

FIG. 13 depicts an edge-gated injection manifold assembly 1302 for distributing a melt stream of moldable material to a plurality of mold cavities aligned on opposing sides of the injection manifold assembly in accordance with another embodiment hereof that may be used with all features described with reference to other embodiments hereof such that only features that differ from those already described will be detailed herein. Injection manifold assembly 1302 has an injection manifold 1360 that defines an upstream surface 1311, a downstream surface 1313, opposing side surfaces 1315, 1315' and opposing end surfaces (not shown) with a heating element of a heater (not shown) within a continuous groove formed in the surfaces thereof as similarly described above. Downstream opposing side surfaces 1315a, 1315a' are formed to be at an acute angle $\Theta$ relative to a respective opposing side surface 1315, 1315' of injection manifold 1360 such that each side surface 1315a, 1315a' is angled toward a centerline $C_L$ of injection manifold assembly 1302. Injection manifold 1360 includes melt channel 1332 formed therein for receiving a melt stream of moldable material, as described above, and distributing the melt stream via a plurality of melt outlets 1329, each of which is formed in a respective angled side surface 1315a, 1315a', to respective nozzle seals 244 and cavity inserts 1304. With such a configuration, nozzle seal 244, an upstream end of which slidably sits against a respective angled side surface 1315a, 1315a' of injection manifold 1360, provides a melt stream injection through its respective mold gate 1322 that is represented by injection trajectory $I_T$, which creates a positive angle of injection relative to a longitudinal axis $L_A$ of cavity insert 1304. In addition to a sealing preload applied by nozzle seal 244 as described above, thermal expansion of injection manifold assembly 1302 towards a parting line $P_L$ of the mold aids in wedging nozzle seals 244 between injection manifold 1360 and cavity insert 1304. An optional support pad 1339, which may be fixed or adjustable in size, may be positioned between downstream surface 1313 of injection manifold 1360 and a mold core plate (not shown) to limit thermal expansion of the injection manifold toward the parting line $P_L$ and subsequently reduce pressure on nozzle seals 244.

Figure 14:
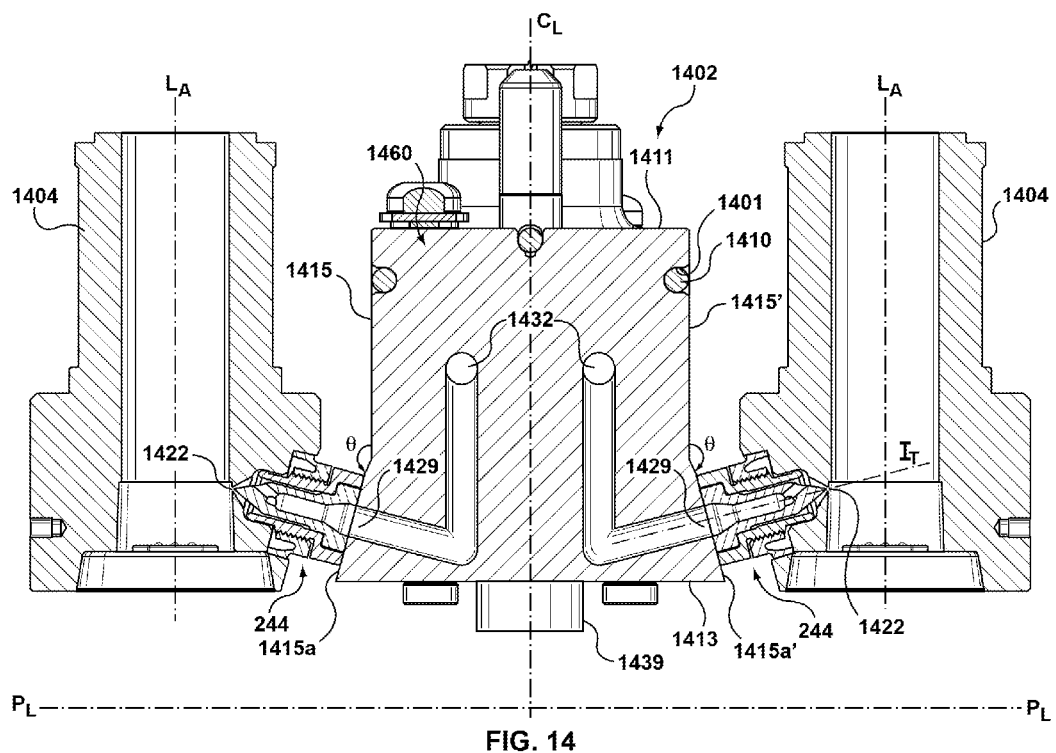

FIG. 14 depicts an edge-gated injection manifold assembly 1402 for distributing a melt stream of moldable material to a plurality of mold cavities aligned on opposing sides of the injection manifold assembly in accordance with another embodiment hereof that may be used with all features described with reference to other embodiments hereof such that only features that differ from those already described will be detailed herein. Injection manifold assembly 1402 has an injection manifold 1460 that defines an upstream surface 1411, a downstream surface 1413, opposing side surfaces 1415, 1415' and opposing end surfaces (not shown) with a heating element of a heater 1410 within a continuous groove 1401 formed in the surfaces thereof as similarly described above. Downstream opposing side surfaces 1415a, 1415a' are formed to be at an obtuse angle $\Theta$ relative to a respective opposing side surface 1415, 1415' of injection manifold 1460 such that each side surface 1415a, 1415a' is angled outward relative to a centerline $C_L$ of injection manifold assembly 1402. In embodiments hereof, angle $\Theta$ may be between 91° and 179°. Injection manifold 1460 includes melt channel 1432 formed therein for receiving a melt stream of moldable material, as described above, and distributing the melt stream via a plurality of melt outlets 1429, each of which is formed in a respective angled side surface 1415a, 1415a', to respective nozzle seals 244 and cavity inserts 1404. With such a configuration, nozzle seal 244, an upstream end of which slidably sits against a respective angled side surface 1415a, 1415a' of injection manifold 1460, provides a melt stream injection through its respective mold gate 1422 represented by injection trajectory $I_T$ that is at a negative angle relative to a longitudinal axis $L_A$ of cavity insert 1404, which promotes clean shearing-off of a molded part at the gate vestige on mold opening. As described above, a sealing preload may be applied between injection manifold assembly 1402 and cavity insert 1404 by nozzle seal 244. Insulative support pad 1439, which may be fixed by a cap screw (not shown) to injection manifold 1460, may be positioned between downstream surface 1413 of injection manifold 1460 and a cover plate (not shown) to limit thermal expansion of the injection manifold toward the parting line $P_L$ and prevent a gap from forming between nozzle seal 244 and a respective angled side surface 1415a, 1415a' of injection manifold 1460 under operating conditions.

Figure 15:
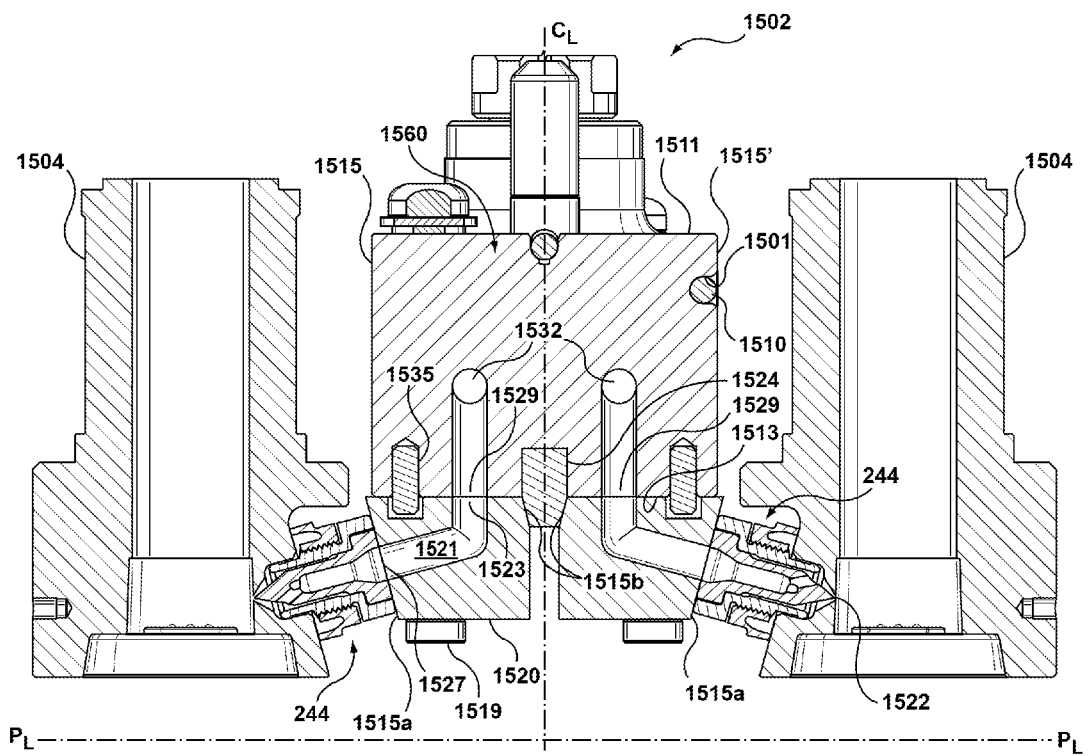

FIG. 15 depicts an edge-gated injection manifold assembly 1502 for distributing a melt stream of moldable material to a plurality of mold cavities aligned on opposing sides of the injection manifold assembly in accordance with another embodiment hereof that may be used with all features described with reference to other embodiments hereof such that only features that differ from those already described will be detailed herein. Injection manifold assembly 1502 has an injection manifold 1560 that defines an upstream surface 1511, a downstream surface 1513, opposing side surfaces 1515, 1515' and opposing end surfaces (not shown). Injection manifold 1560 has a continuous groove 1501 formed in the surfaces thereof for receiving heating element 1510 as similarly described above. Injection manifold 1560 includes melt channel 1532 formed therein for receiving a melt stream of moldable material, as described above, and distributing the melt stream via a plurality of melt outlets 1529 in downstream surface 1513 to a plurality of diverter blocks 1520. Each diverter block 1520 includes a melt inlet 1523 and a melt outlet 1527 with a melt channel 1521 extending therebetween and is individually coupled to injection manifold downstream surface 1513 by one or more cap screws 1519 such that each diverter block melt inlet 1523 is aligned with a respective injection manifold melt outlet 1529. Dowels 1535 extend between corresponding bores in injection manifold downstream surface 1513 and the upstream surface of diverter block 1520 and a key component 1524 extends from a corresponding groove in injection manifold downstream surface 1513 to contact opposing beveled inside surfaces 1515b of a pair of diverter blocks 1520. Dowels 1535 and key component 1524 aid in aligning injection manifold melt outlets 1529 with a respective diverter block melt inlet 1523 during assembly as well as maintain alignment therebetween during thermal expansion that occurs as the system is brought to an operating temperature.

An outside surface 1515a of each diverter block 1520, which includes the diverter block melt outlet 1527, is formed to be at an acute angle relative to a centerline $C_L$ of injection manifold assembly 1502 such that each outside surface 1515a is angled relative to a respective side surface 1515, 1515' of injection manifold 1560. In the embodiment shown in FIG. 15, diverter block melt channel 1521 includes a bend having greater than a 90° angle for directing the melt stream between diverter block melt inlet 1523 in an upstream surface of diverter block 1520 and diverter block melt outlet 1527 in angled outside surface 1515a thereof. In the embodiment of FIG. 15, nozzle seal 244, an upstream end of which slidably sits against a respective angled outside surface 1515a, for fluidly communicating a melt stream received from diverter block melt outlet 1527 to cavity insert 1504 via a respective mold gate 1522. As described above, a sealing preload may be applied between the components of injection manifold assembly 1502 by nozzle seal 244.

Each diverter block 1520 may be disassembled from injection manifold 1560 from a parting line $P_L$ of the mold and thus provides access to its respective nozzle seal 244 from the parting line $P_L$ of the mold without removal of cavity insert 1504. In embodiments hereof, an angle of the interface between a beveled edge of key component 1524 and a respective diverter block beveled inside surface 1515b must be equal to or greater than an angle of the interface between an upstream surface of nozzle seal 244 and a respective diverter block outside surface 1515a in order to facilitate removal of diverter block 1520 from injection molding assembly 1502 while a downstream end of its corresponding nozzle seal 244 is secured within a counter bore that is coaxial with and leads to mold gate 1522 of cavity insert 1504.

Figure 16:
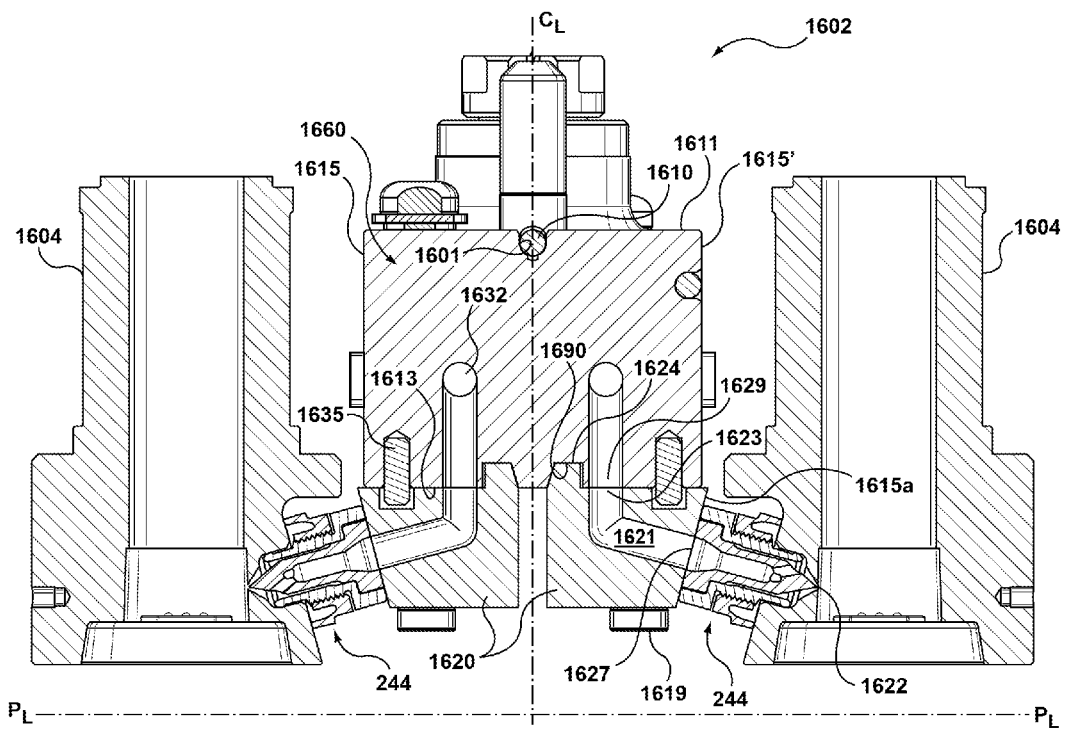

FIG. 16 depicts edge-gated injection manifold assembly 1602 for distributing a melt stream of moldable material to a plurality of mold cavities aligned on opposing sides of the injection manifold assembly in accordance with another embodiment hereof that may be used with all features described with reference to other embodiments hereof such that only features that differ from those already described will be detailed herein. Injection manifold assembly 1602 has an injection manifold 1660 that defines an upstream surface 1611, a downstream surface 1613, opposing side surfaces 1615, 1615' and opposing end surfaces (not shown). Injection manifold 1660 has a continuous groove 1601 formed in the surfaces thereof for receiving heating element 1610 as similarly described above. Injection manifold 1660 includes melt channel 1632 formed therein for receiving a melt stream of moldable material, as described above, and distributing the melt stream via a plurality of melt outlets 1629 in downstream surface 1613 to a plurality of diverter blocks 1620. Each diverter block 1620 includes a melt inlet 1623 and a melt outlet 1627 with a melt channel 1621 extending therebetween and is individually coupled to injection manifold downstream surface 1613 by one or more cap screws 1619 such that each diverter block melt inlet 1623 is aligned with a respective injection manifold melt outlet 1629. Dowels 1635 extend between corresponding bores in injection manifold downstream surface 1613 and the upstream surface of diverter block 1620 and a bevel-edged projection 1624 of diverter block 1620 extends into a corresponding groove 1690 in injection manifold downstream surface 1613 to aid in aligning injection manifold melt outlets 1629 with a respective diverter block melt inlet 1623 during assembly as well as to maintain alignment therebetween during thermal expansion that occurs as the system is brought to an operating temperature. Bevel-edged projection 1624 of diverter block 1620 and groove 1690 have an interface therebetween that is at an angle relative to a centerline of injection manifold assembly 1602.

An outside surface 1615a of each diverter block 1620, which includes the diverter block melt outlet 1627, is formed to be at an acute angle relative to a centerline $C_L$ of injection manifold assembly 1602 such that each outside surface 1615a is angled relative to a respective side surface 1615, 1615' of injection manifold 1660. In the embodiment shown in FIG. 16, diverter block melt channel 1621 includes a bend having greater than a 90° angle for directing the melt stream between diverter block melt inlet 1623 in an upstream surface of diverter block 1620 and diverter block melt outlet 1627 in angled outside surface 1615a thereof. In the embodiment of FIG. 16, nozzle seal 244 has an upstream end slidably disposed against a respective angled outside surface 1615a for fluidly communicating a melt stream received from diverter block melt outlet 1627 to cavity insert 1604 via a respective mold gate 1622. As described above, a sealing preload may be applied between the components of injection manifold assembly 1602 by nozzle seal 244.

Each diverter block 1620 may be disassembled from injection manifold 1660 from a parting line $P_L$ of the mold and thus provides access to its respective nozzle seal 244 from the parting line $P_L$ of the mold without removal of cavity insert 1604. In embodiments hereof, an angle of the interface between bevel-edged projection 1624 of diverter block 1620 and groove 1690 must be equal to or greater than an angle of the interface between an upstream surface of nozzle seal 244 and a respective diverter block outside surface 1615a in order to facilitate removal of diverter block 1620 from injection molding assembly 1602 while a downstream end of its corresponding nozzle seal 244 is secured within a counter bore leading to and coaxial with mold gate 1622 of cavity insert 1604.

Figure 17:
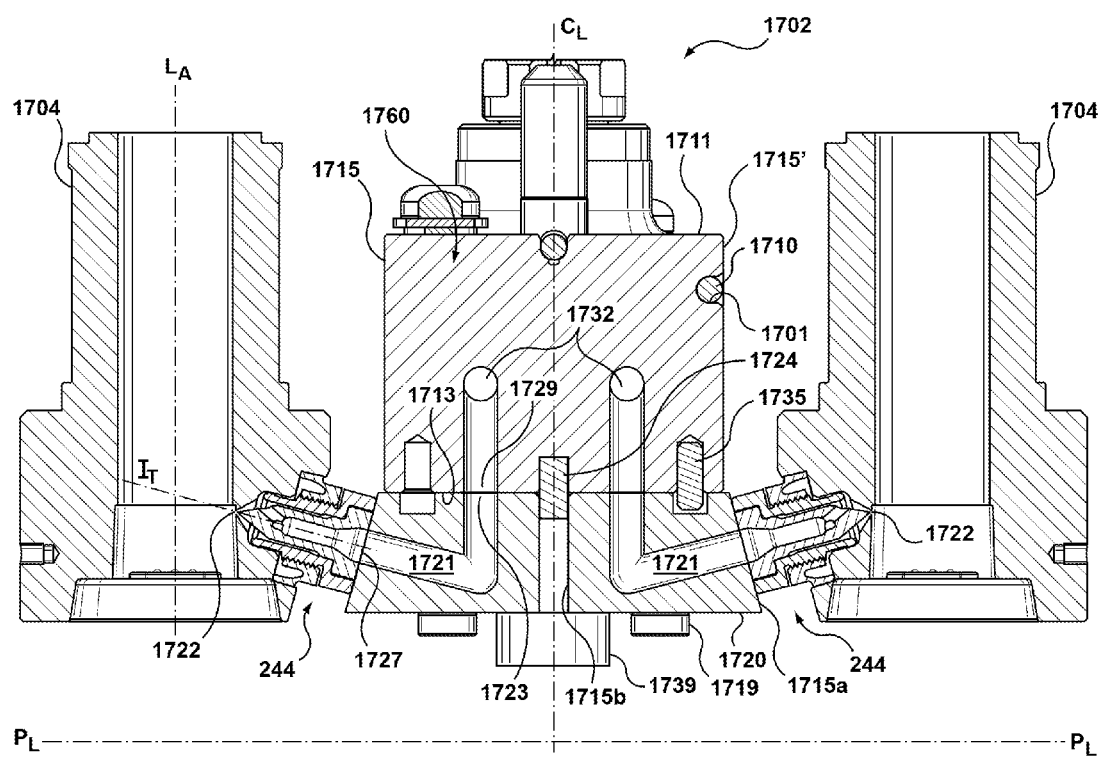

FIG. 17 depicts an edge-gated injection manifold assembly 1702 for distributing a melt stream of moldable material to a plurality of mold cavities aligned on opposing sides of the injection manifold assembly in accordance with another embodiment hereof that may be used with all features described with reference to other embodiments hereof such that only features that differ from those already described will be detailed herein. Injection manifold assembly 1702 has an injection manifold 1760 that defines an upstream surface 1711, a downstream surface 1713, opposing side surfaces 1715, 1715' and opposing end surfaces (not shown). Injection manifold 1760 has a continuous groove 1701 formed in the surfaces thereof for receiving heating element 1710 as similarly described above. Injection manifold 1760 includes melt channel 1732 formed therein for receiving a melt stream of moldable material, as described above, and distributing the melt stream via a plurality of melt outlets 1729 in downstream surface 1713 to a plurality of diverter blocks 1720. Each diverter block 1720 includes a melt inlet 1723 and a melt outlet 1727 with a melt channel 1721 extending therebetween and is individually coupled to injection manifold downstream surface 1713 by one or more cap screws 1719 such that each diverter block melt inlet 1723 is aligned with a respective injection manifold melt outlet 1729. Dowels 1735 extend between corresponding bores in injection manifold downstream surface 1713 and the upstream surface of diverter block 1720 and a key component 1724 extends from a corresponding groove in injection manifold downstream surface 1713 to contact opposing inside surfaces 1715b of a pair of diverter blocks 1720. Dowels 1735 and key component 1724 aid in aligning injection manifold melt outlets 1729 with a respective diverter block melt inlet 1723 during assembly as well as maintain alignment therebetween during thermal expansion that occurs as the system is brought to an operating temperature.

An outside surface 1715a of each diverter block 1720, which includes the diverter block melt outlet 1727, is formed to be at an obtuse angle relative to a respective opposing side surface 1715, 1715' of injection manifold 1760 such that diverter block outside surface 1715a is angled outward relative to a centerline $C_L$ of injection manifold assembly 1702. In the embodiment shown in FIG. 17, diverter block melt channel 1721 includes a bend having less than a 90° angle for directing the melt stream between diverter block melt inlet 1723 in an upstream surface of diverter block 1720 and diverter block melt outlet 1727 in angled outside surface 1715a thereof. In the embodiment of FIG. 17 nozzle seal 244 has an upstream end slidably disposed against a respective angled outside surface 1715a for fluidly communicating a melt stream received from diverter block melt outlet 1727 to cavity insert 1704 via a respective mold gate 1722. In such a configuration, nozzle seal 244 provides a melt stream injection through its respective mold gate 1722 represented by injection trajectory $I_T$ that is at a negative angle relative to a longitudinal axis $L_A$ of cavity insert 1704, which promotes clean shearing-off of a molded part at the gate vestige on mold opening. As described above, a sealing preload may be applied between the components of injection manifold assembly 1702 by nozzle seal 244. Insulative support pad 1739 may be positioned between downstream surfaces of diverter blocks 1720 and a mold core plate (not shown) to limit thermal expansion of the injection manifold assembly 1702 and particularly diverter blocks 1720 toward the parting line $P_L$ and thereby prevent a gap from forming between nozzle seal 244 and a respective angled side surface 1715a of diverter block 1720 under operating conditions.

Each diverter block 1720 may be disassembled from injection manifold 1760 from a parting line $P_L$ of the mold and thus provides access to its respective nozzle seal 244 from the parting line $P_L$ of the mold without removal of cavity insert 1704.

Injection manifolds in accordance with embodiments hereof may be formed from H13. Diverter blocks in accordance with embodiments hereof may be formed from a thermally conductive material having sufficient strength for injection molding applications in which they are to be utilized, such as a high strength copper alloy or the like.

If a melt imbalance is discovered between melt cavities fed by a particular injection manifold assembly according to an embodiment hereof, a melt imbalance between mold cavities may be addressed by selecting one or more nozzle seal spacers and diverter blocks (one or all of them) of different materials. More particularly, as appropriate, one or more nozzle seal spacers or diverter blocks may be formed from a more thermally conductive material than other of the nozzle seal spacers or diverter blocks in order to draw more heat from the injection manifold and in turn to reduce the viscosity of the molding material flowing through that nozzle seal spacer or diverter block so as to promote increased flow and therefore faster filling of its associated mold cavity. Conversely a less thermally conductive nozzle seal spacer or diverter block may be used in embodiments hereof to restrict heat transfer from the injection manifold which would in turn increase the viscosity of the molding material flowing through that nozzle seal spacer or diverter block so as to reduce flow and therefore slow filling of its associated mold cavity. In this manner in certain applications by selecting a nozzle seal spacer or diverter block with an appropriate thermal conductivity for each melt outlet of an injection manifold, melt flow may be balanced between the associated melt cavities for a particular injection manifold. For instance, at outlets positioned in a midsection of the injection manifold, which may be hotter, less thermally conductive nozzle seal spacers or diverter blocks may be used, and at outlets near the ends of the injection manifold, which may be less hot, more thermally conductive nozzle seal spacers or diverter blocks may be used. In embodiments hereof, nozzle seal spacers or diverter blocks having different thermal conductivities may be of different high strength copper alloys, such as of Ampco 940 with a thermal conductivity of 208 w/mk and of Ampco 944 with thermal conductivity of 156 w/mk. In another embodiment in order to balance melt flow, each nozzle seal spacer or diverter block may be separately heated to control the viscosity of the molding material flowing therethrough.

In another embodiment in order to correct an imbalance between the mold cavities that are fed by a respective injection manifold assembly, melt channels extending through the nozzle seal spacers or diverter blocks may be selected or altered to have different widths and/or lengths there between to effect a respective melt flow rate and/or volume there through. For instance, a width of a melt channel of a nozzle seal spacer or diverter block may be selected or made wider to promote increased melt flow through the respective nozzle seal spacer or diverter block and therefore faster filling of the associated mold cavity, or may be selected or made narrower to provide a more restricted flow through the respective nozzle seal spacer or diverter block and therefore slower filling of the associated mold cavity.

In any of the embodiments described above, a copper plate may be disposed across a top or upstream surface of the injection manifold to evenly distribute heat.

While various embodiments have been described above, it should be understood that they have been presented only as illustrations and examples of the present invention, and not by way of limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment. All patents and publications discussed herein are incorporated by reference herein in their entirety.

What is claimed is:

1. An edge-gated injection molding apparatus comprising:
an injection manifold assembly for distributing a melt stream of moldable material to a plurality of mold cavities of a mold that are aligned on opposing sides of the injection manifold assembly, the injection manifold assembly having
a plurality of melt outlets with each melt outlet being in fluid communication with a respective mold cavity of the plurality of mold cavities, and
a plurality of nozzle seals for receiving the melt stream from the plurality of melt outlets of the injection manifold assembly and delivering the melt stream to the plurality of mold cavities, wherein each nozzle seal includes a nozzle tip coaxially received within a gate seal and wherein the gate seal includes an inner sealing component threadably coupled within an outer sealing component such that relative rotation therebetween applies a sealing preload between the nozzle seal and a first surface proximate to a respective melt outlet and a second surface surrounding a respective mold gate of a corresponding mold cavity.

2. The edge-gated injection molding apparatus of claim 1, wherein the injection manifold assembly further includes an injection manifold having opposing side surfaces in which the plurality of melt outlets are formed.

3. The edge-gated injection molding apparatus of claim 2, wherein the first surface proximate to a respective melt outlet is a respective side surface of the injection manifold that surrounds the melt outlet against which upstream surfaces of the nozzle tip and the inner seal component of the associated nozzle seal are slidably disposed so as to accommodate thermal expansion.

4. The edge-gated injection molding apparatus of claim 3, wherein the respective side surface is angled outward relative to a centerline of the injection manifold.

5. The edge-gated injection molding apparatus of claim 3, wherein the respective side surface is angled toward a centerline of the injection manifold.

6. The edge-gated injection molding apparatus of claim 3, wherein the injection manifold is T-shaped.

7. The edge-gated injection molding apparatus of claim 1, wherein the outer sealing component includes a face seal surface for contacting and sealing against the second surface surrounding the respective mold gate of the corresponding mold cavity.

8. The edge-gated injection molding apparatus of claim 7, wherein a downstream end of the inner sealing component includes an outer circumferential surface for contacting and sealing against a bore that is coaxial with and leads to the respective mold gate of the corresponding mold cavity.

9. The edge-gated injection molding apparatus of claim 1, wherein the injection manifold assembly further includes
an injection manifold having opposing side surfaces in which the plurality of melt outlets are formed, and
a plurality of nozzle seal spacers, wherein a respective nozzle seal spacer is positioned between upstream surfaces of the nozzle tip and the inner seal component of the associated nozzle seal and a respective side surface of the injection manifold with a respective melt bore of the nozzle seal spacer being in fluid communication with a respective melt outlet of the injection manifold and with an associated melt inlet of the nozzle tip.

10. The edge-gated injection molding apparatus of claim 9, wherein each nozzle seal spacer has a thickness that corresponds to an installation gap that permits manipulation of the associated nozzle seal from a parting line of the mold into and out of a counter bore of an associated mold gate.

11. The edge-gated injection molding apparatus of claim 9, wherein the first surface is a downstream surface of each nozzle seal spacer against which the upstream surfaces of the nozzle tip and the inner seal component of the associated nozzle seal are slidably disposed to accommodate thermal expansion.

12. The edge-gated injection molding apparatus of claim 1, wherein the injection manifold assembly includes an injection manifold and a plurality of diverter blocks that are attached to a downstream surface of the injection manifold.

13. The edge-gated injection molding apparatus of claim 12, wherein each of the plurality of diverter blocks defines one of the plurality of melt outlets of the injection manifold assembly in an outside surface thereof against which a respective nozzle seal is slidably disposed.

14. The edge-gated injection molding apparatus of claim 13, wherein the side surface of the diverter block that includes the melt outlet is angled outward relative to a centerline of the injection manifold.

15. The edge-gated injection molding apparatus of claim 13, wherein the side surface of the diverter block that includes the melt outlet is angled toward a centerline of the injection manifold.

16. The edge-gated injection molding apparatus of claim 13, wherein a key component extends from a corresponding groove in the injection manifold downstream surface to contact opposing inside surfaces of a pair of diverter blocks.

17. The edge-gated injection molding apparatus of claim 12, wherein each of the plurality of diverter blocks defines a pair of the plurality of melt outlets of the injection manifold assembly against which respective nozzle seals are slidably disposed.

18. The edge-gated injection molding apparatus of claim 17, wherein each diverter block is individually attached to the downstream surface of the injection manifold to be positioned such that melt inlets of the diverter block are aligned with respective melt outlets in the bottom surface of the injection manifold and one of the pair of melt outlets is in a first side surface of the diverter block and the other of the pair of melt outlets is in an opposing second side surface of the diverter block.

19. The edge-gated injection molding apparatus of claim 17, wherein each diverter block is individually coupled to the injection manifold downstream surface by a clamping plate that is held against the diverter block by a fastener.

20. The edge-gated injection molding apparatus of claim 1, wherein a downstream end of each nozzle seal is received within a bore that surrounds a mold gate of the respective mold cavity associated therewith.

* * * * *